United States Patent
Suzuki et al.

(10) Patent No.: US 9,132,851 B2
(45) Date of Patent: Sep. 15, 2015

(54) STEERING APPARATUS

(75) Inventors: Kenichi Suzuki, Gunma (JP); Seiichi Moriyama, Gunma (JP); Hiroshi Shibasaki, Gunma (JP); Kazuhiko Kojima, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 13/810,943

(22) PCT Filed: May 29, 2012

(86) PCT No.: PCT/JP2012/063751
§ 371 (c)(1),
(2), (4) Date: Mar. 7, 2013

(87) PCT Pub. No.: WO2013/001965
PCT Pub. Date: Jan. 3, 2013

(65) Prior Publication Data
US 2013/0213174 A1    Aug. 22, 2013

(30) Foreign Application Priority Data

Jun. 28, 2011  (JP) ................. 2011-143586

(51) Int. Cl.
*B62D 1/18*      (2006.01)
*B62D 1/187*    (2006.01)
*B62D 1/184*    (2006.01)

(52) U.S. Cl.
CPC ............... *B62D 1/187* (2013.01); *B62D 1/184* (2013.01)

(58) Field of Classification Search
CPC .................................................. B62D 1/185
USPC ..................... 280/775, 779; 74/493
See application file for complete search history.

(56) References Cited

U.S. PATENT DOCUMENTS 4,648,624 A    3/1987  Mouhot et al.
5,730,465 A *  3/1998  Barton et al. ................. 280/775
(Continued)

FOREIGN PATENT DOCUMENTS

JP    62-74767    4/1987
JP    H5-60982    8/1993
(Continued)

OTHER PUBLICATIONS

International Search Report dated Sep. 4, 2012 from International Application No. PCT/JP2012/063751.
(Continued)

*Primary Examiner* — James English
(74) *Attorney, Agent, or Firm* — Katten Muchin Rosenman LLP

(57) ABSTRACT

The present invention provides a steering apparatus having simple construction, and good left and right balance of the clamping force, such that the clamping force does not fluctuate depending on the forward-backward position of the steering wheel 103. When fastening the tilt and telescopic function, by rotating an operation lever 349, the peak of a movable cam 344 runs over the peak of a stationary cam 343, which pushes the stationary cam 343 to the right side, and pulls a clamping rod 34 to the left side at the same time, so as to clamp side plates 32A, 32B. The inside surfaces 321A, 321B of the side plates 32A, 32B clamp flat surface section 61A, 62B of a distance bracket 6. The flat surface sections 62A, 62B elastically deform toward the inside in the width direction of the vehicle, and a pair of left and right clamping sections 66A, 66B of bent sections 64A, 64B clamp the outer circumferential surface of an inner column 2 from both the left and right sides.

9 Claims, 40 Drawing Sheets

(56) References Cited

U.S. PATENT DOCUMENTS

| | | | |
|---|---|---|---|
| 5,979,265 A * | 11/1999 | Kim et al. | 74/493 |
| 6,467,807 B2 * | 10/2002 | Ikeda et al. | 280/775 |
| 2006/0028010 A1 * | 2/2006 | Yamada | 280/775 |
| 2007/0175375 A1 * | 8/2007 | Watanabe | 114/144 R |
| 2011/0175335 A1 * | 7/2011 | Takezawa et al. | 280/775 |

FOREIGN PATENT DOCUMENTS

| | | |
|---|---|---|
| JP | 05-262238 | 10/1993 |
| JP | 10-053144 | 2/1998 |
| JP | 2002-067976 | 3/2002 |
| JP | 2002-274393 | 9/2002 |
| JP | 2006-69524 | 3/2006 |
| JP | 2008-044498 | 2/2008 |
| JP | 2010-105662 | 5/2010 |
| JP | 2010-189004 | 9/2010 |
| WO | 2009/013457 | 1/2009 |

OTHER PUBLICATIONS

Japanese Office Action dated Nov. 11, 2014, from the corresponding JP2014-003724.

Japanese Office Action dated Oct. 15, 2013, from the corresponding JP2011-143586.

* cited by examiner

STEERING APPARATUS

TECHNICAL FIELD

The present invention relates to a steering apparatus, and more particularly to a steering apparatus that comprises a telescopic mechanism that makes it possible to adjust the forward-backward position of a steering wheel, and a shock absorbing function that makes it possible for the steering wheel to displace in the forward direction while absorbing an impact load that is applied from a driver during a secondary collision.

BACKGROUND ART

There are steering apparatuses that in order to make it possible to adjust the forward-backward position of a steering wheel comprise a telescopic function that is constructed by a steering column having an outer column and an inner column that are fitted together so that sliding movement is possible in the axial direction. Moreover, there are also steering apparatuses that comprise a shock absorbing function that, during a collision accident of a vehicle, is able to protect the driver by allowing the steering wheel to displace in the forward direction while at the same time absorbs an impact load that is applied from the driver during a secondary collision that occurs following a primary collision in which an automobile collides with another automobile or the like, when the driver collides with the steering wheel. In a steering apparatus that comprises a telescopic function and an impact absorbing function, there is construction as disclosed in WO 2009/013457 (A1) in which together with forming a slit in the axial direction of the outer column, a clamp apparatus that expands or contracts this outer column in the width direction and an operation lever that operates this clamp apparatus are provided, and by operating this operation lever, the diameter of the outer column is contracted, and by tightly fastening the outer circumferential surface of the inner column to the inner circumferential surface of the outer column, it is possible to clamp the inner column to the outer column so that relative movement in the axial direction is not possible.

In a steering apparatus with a telescopic mechanism, by operating the operation lever in the opposite direction, the tight fit of the outer column around the inner column is released, and then by expanding or contracting the entire steering column by sliding the outer column with respect to the inner column, the forward-backward position of the steering wheel can be adjusted. However, in a steering apparatus with a shock absorbing function, during normal operation, the outer column is supported by a vehicle-side bracket that is supported by the vehicle body, however, during a secondary collision, due to an impact load that is applied to the outer column, the outer column is able to displace in the forward direction by breaking away from the vehicle-side bracket, while an energy absorbing member that is provided between the outer column and the vehicle side absorbs the impact load.

However, in the steering apparatus having the construction disclosed in WO 2009/013457 (A1), one end of the slit in the outer column is open to the end surface in the axial direction of this outer column. Therefore, depending on the position in the forward-backward direction of the steering wheel, the distance between the closed end section on the other end of the slit and the clamped position of the outer column changes. Therefore, even though the diameter of the outer column is contracted by a specific force using the expansion and contraction mechanism, depending on the position in the forward-backward direction of the steering wheel, there is a problem in that the clamping force of the outer column on the inner column fluctuates.

In a steering apparatus that is disclosed in JP 2002-274393 (A), a distance bracket (column-side bracket) that is divided into two parts is arranged so as to face both sides in the width direction of the steering column, and by directly clamping the outer circumferential surface of the inner column with one distance bracket, the clamping force of the outer column on the inner column does not fluctuate depending on the forward-backward position of the steering wheel.

However, in the construction disclosed in JP 2002-274393 (A), the outer circumferential surface of the outer column is clamped by one distance bracket, ant the outer circumferential surface of the inner column is clamped by the other distance bracket. Therefore, only the outer circumferential surface on one side in the width direction of the inner column is clamped, so there is a problem in that the balance on the left and right of the clamping force is bad. Moreover, each of the two distance brackets is supported so as to be able to pivot around a pin, so there are problems in that construction of the distance bracket is complicated, and the manufacturing cost increases.

Furthermore, in a steering apparatus disclosed in JP 5-262238 (A), the inner column is directly clamped by a pressure piece that is supported by the distance bracket so as to be able to slide. In the construction disclosed in JP 5-262238 (A) as well, the outer circumferential surface of the inner column is clamped on only one side by one pressure piece, so there is a problem in that the balance on the left and right of the clamping force is bad. Moreover, the pressure piece is a separate part from the distance bracket and is supported by the distance bracket so as to be able to slide, so there are problems in that construction is complicated, and the manufacturing cost increases.

The contents of WO 2009/013457 (A1), JP 2002-274393 (A) and JP 5-262238 (A) are incorporated in this specification by reference.

RELATED LITERATURE

Patent Literature

[Patent Literature 1] WO2009/013457 (A1)
[Patent Literature 2] JP 2002-274393 (A)
[Patent Literature 3] JP 5-262238 (A)

SUMMARY OF THE INVENTION

Problem to be Solved by the Invention

The object of the present invention is to provide a steering apparatus that has simple construction, has good left and right balance of the clamping force for clamping the steering column, and has no fluctuation in the clamping force depending on the position in the forward-backward direction of the steering wheel.

Means for Solving the Problems

The steering apparatus of the present invention comprises:
an inner column;
an outer column that is fitted around the inner column such that relative sliding movement is possible, and that comprises a pair of left and right through holes;
a vehicle installation bracket that comprises left and right side plates, and that can be attached to a vehicle;

a distance bracket that comprises a pair of left and right clamping sections that are inserted through the pair of left and right through hole and can clamp the outer circumferential surface of the inner column, and together with being fastened to the outer circumferential surface of the outer column, is held between the left and side plates of the vehicle installation bracket so as to be able slide; and a clamping apparatus that clamps the left and right side plates of the vehicle installation bracket onto the distance bracket.

In the steering apparatus of the present invention, when the distance bracket is clamped by the left and right side plates of the vehicle installation bracket by the clamping apparatus, the pair of left and right clamping sections of the distance bracket directly clamp the outer circumferential surface of the inner column, and clamp the inner column such that relative movement in the axial direction with respect to the outer column is not possible.

Preferably, the distance bracket is integrally formed into a U shape, and an arc shaped section of the distance bracket fits around the outer circumferential surface of the outer column, and this distance bracket is fastened to the outer circumferential surface of the outer column.

Alternatively, the distance bracket can be divided into left and right components, and one end of each of the components can be fastened to the outer circumferential surface of the outer column.

Bent sections that are bent toward the inside in the width direction of the vehicle can be formed on both ends in the forward-backward direction of the vehicle of the portion of the distance bracket that is held between the left and right side plates of the vehicle installation bracket, and the clamping sections can be formed on the inside surfaces in the width direction of the vehicle of the bent sections.

Alternatively or additionally, bent sections or protruding sections that extend toward the inside in the width direction of the vehicle can be formed along the entire length in the forward-backward direction of the portion of the distance bracket that is held between the left and right side plats of the vehicle installation bracket, and the clamping sections can be formed by the surfaces of the bent sections or protruding sections that come in contact with the outer circumferential surface of the inner column.

Preferably, the portion of the distance bracket that is fitted around the outer column is fastened to the outer circumferential surface of the outer column by welding, and the length direction of the weld that fastens the distance bracket to the outer column is inclined with respect to the center axis line of the outer column.

In the present invention, the left and right clamping sections of the distance bracket can be arc shaped or straight. Moreover, the steering apparatus of the present invention can be constructed such that the left and right clamping sections of the distance bracket clamp the outer circumferential surface on the side of the inner column toward the bottom of the vehicle, or the outer circumferential surface of the inner column toward the top of the vehicle. Furthermore, the inner column and the outer column can be formed into a hollow cylindrical shape or a hollow polygonal pipe shape. The steering apparatus of the present invention can also be constructed such that the side toward the front of the vehicle of the inner column or outer column is able to be fastened to the vehicle.

Effect of the Invention

The steering apparatus of the present invention comprises: a distance bracket that is fastened to the outer circumferential surface of the outer column, that has a pair of left and right clamping sections that clamp the outer circumferential surface of the inner column, and that is held between left and right side plates of a vehicle installation bracket so as to be able to slide; a pair of left and right through holes that are formed in the outer column and through which the clamping sections of the distance bracket are inserted; and a clamping apparatus that clamps the left and right side plates of the vehicle installation bracket onto the distance bracket. When fastening the tilt and telescopic functions, the clamp apparatus clamps the left and right side plates of the vehicle installation bracket, and the pair of left and right clamping sections of the distance bracket directly clamp the outer circumferential surface of the inner column, which clamps the inner column such that relative movement in the axial direction with respect to the outer column is not possible.

Therefore, the pair of left and right clamping section of the distance bracket directly clamp the outer circumferential surface of the inner column from both the left and right sides, so the left and right balance of the clamping force is good, and there is no fluctuation in the clamping force by which the outer column clamps the inner column due to the position in the forward-backward direction of the steering wheel. Moreover, one end in the up-down direction of the distance bracket is fastened to the outer circumferential surface of the outer column, and clamping sections that clamp the outer circumferential surface of the inner column are formed on the other end in up-down direction of the distance bracket, so the construction of the distance bracket is simple, thus it is possible to reduce the manufacturing cost.

MODES FOR CARRYING OUT THE INVENTION

Figure 1:
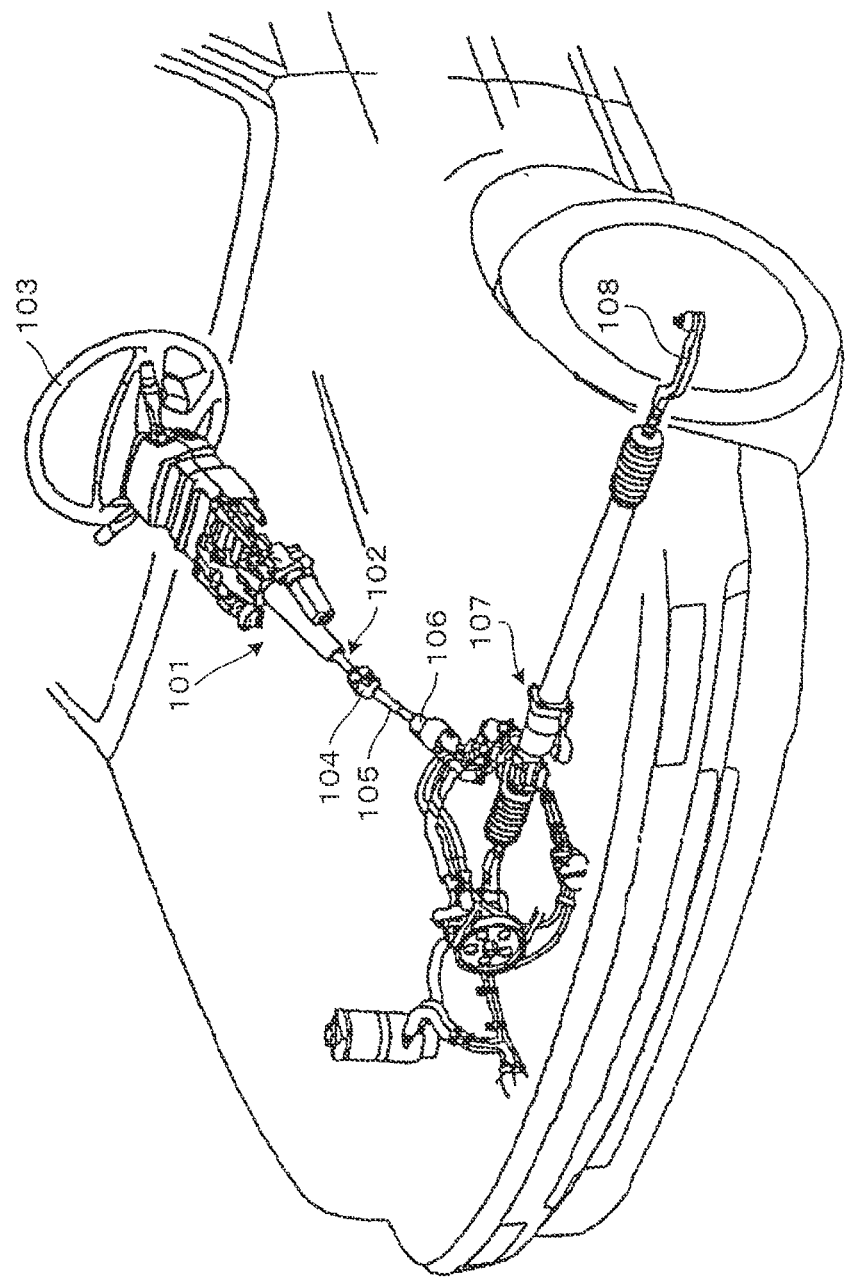
FIG. 1 is an overall perspective view illustrating the state with the steering apparatus of the present invention installed in a vehicle.
Figure 2:
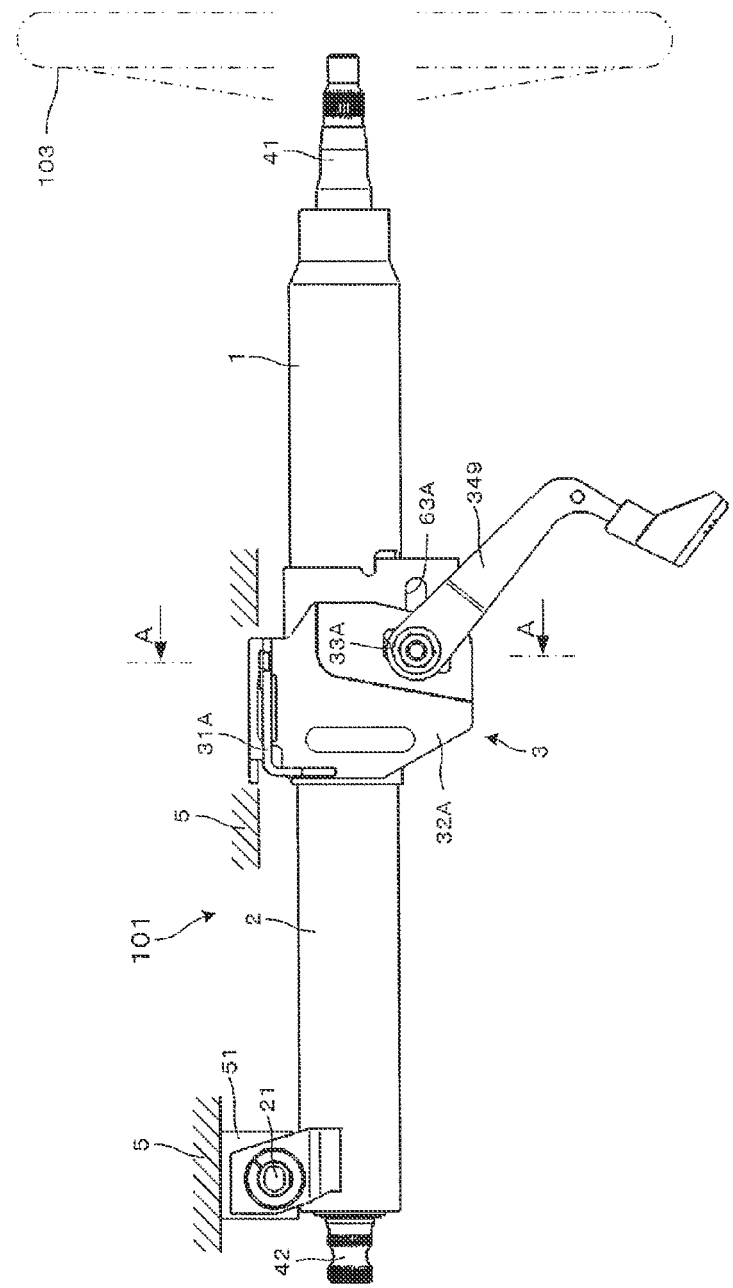
FIG. 2 is a front view illustrating the main parts of a steering apparatus of a first example of an embodiment of the present invention.

FIG. 1 is an overall perspective view illustrating the state of a steering apparatus to which the present invention has been applied that has been installed in a vehicle. The steering apparatus 101 supports a steering shaft 102 such that the steering shaft 102 rotates freely. A steering wheel 103 is mounted on the rear end of the steering shaft 102, and an intermediate shaft 105 is connected to the front end of the steering shaft 102 by way of a universal joint 104. A universal joint 106 is connected to the bottom end of the intermediate shaft 105, and a steering gear 107 that is composed of a rack and pinion mechanism or the like is connected to the universal joint 106.

As the driver turns and operates the steering wheel 103, that rotation force is transmitted to the steering gear 107 by way of the steering shaft 102, universal joint 104, intermediate shaft 105 and universal joint 106, and by causing the tie rods 108 to move by way of the rack and pinion mechanism, it is possible to change the steering angle of the wheels. The feature of the present invention is in a mechanism for supporting a steering column provided with an inner column and an outer column that is fitted around this inner column such that relative sliding movement in the axial direction thereof is possible, in a steering apparatus which comprises a telescopic function that makes it possible to adjust the position in the forward-backward direction of a steering wheel, and a shock absorbing function that allows the steering wheel to displace in the forward direction while absorbing an impact load that is applied from the driver during a secondary collision, and therefore the construction of the other parts of the steering apparatus of the present invention is not limited to the construction illustrated in FIG. 1 as long as the present invention can be applied.

Example 1

FIG. 2 to FIG. 5 illustrate a steering apparatus of a first example of an embodiment of the present invention. As can be seen in the figures, in this example, a steering column is constructed by combining a hollow cylindrical shaped outer column 1 and inner column 2. An upper steering shaft 41 is supported on the inside of the outer column 1 so as to be able to rotate freely, and a steering wheel 103 is attached to the rear end (right side in FIG. 2) of the upper portion of the steering shaft 41 in the forward-backward direction of the vehicle. The inner column 2 fits inside the front end (left side in FIG. 2 and FIG. 4) of the outer column 1 so that sliding movement in the axial direction is possible. The outer column 1 is attached to the vehicle 5 by an upper-side vehicle installation bracket 3, which is the vehicle installation bracket in the present invention.

On the vehicle front side of the inner column 2, a lower vehicle installation bracket 51 is attached to the vehicle 5, and a tilt shaft 21 that is fastened to the vehicle front side of the inner column 2 is supported by the lower vehicle installation bracket 51 such that tilting is possible. Moreover, a lower steering shaft 42 is supported by the inner column 2 so as to be able to rotate freely, and this lower steering shaft 42 fits with the upper steering shaft 41 by a spline fit so that the rotation of the upper steering shaft 41 can be transmitted to the lower steering shaft 42. Furthermore, the front end of the lower steering shaft 42 (left side in FIG. 2) is connected to an intermediate shaft 105 by way of a universal joint 104 as illustrated in FIG. 1, and the front end of this intermediate shaft 105 is connected to a steering gear 107.

Figure 3:
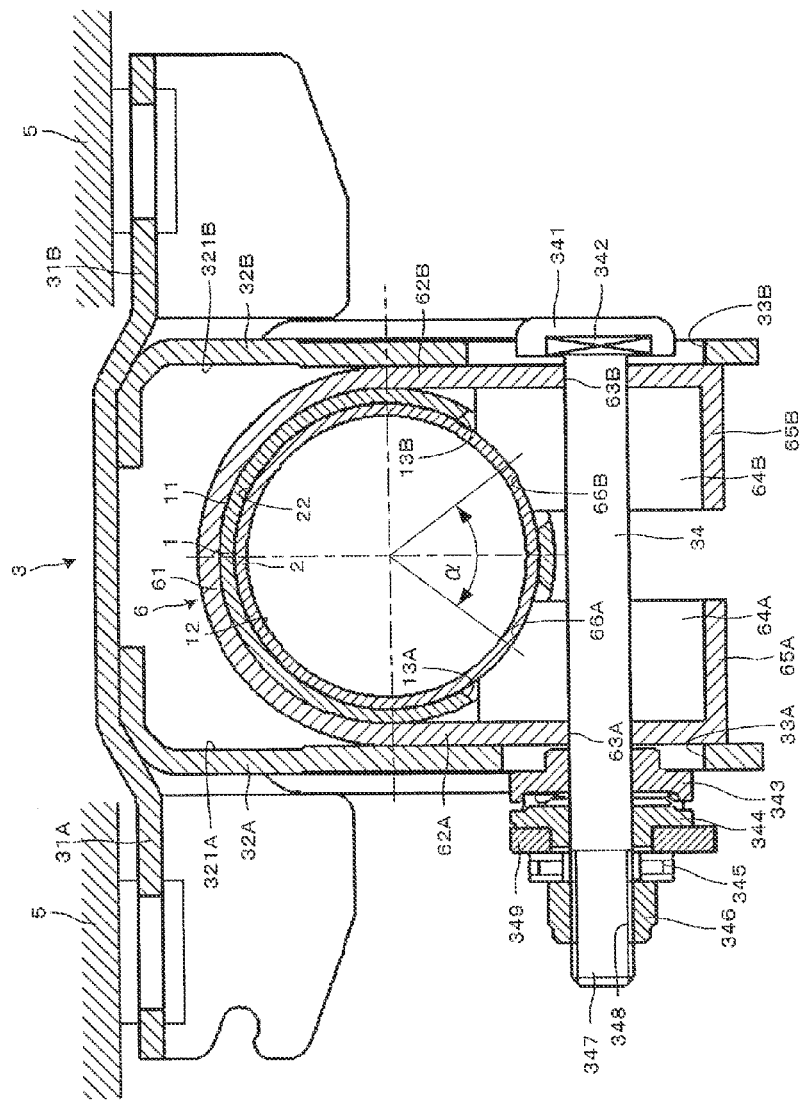
FIG. 3 is a cross-sectional view of section A-A in FIG. 2.
Figure 4:
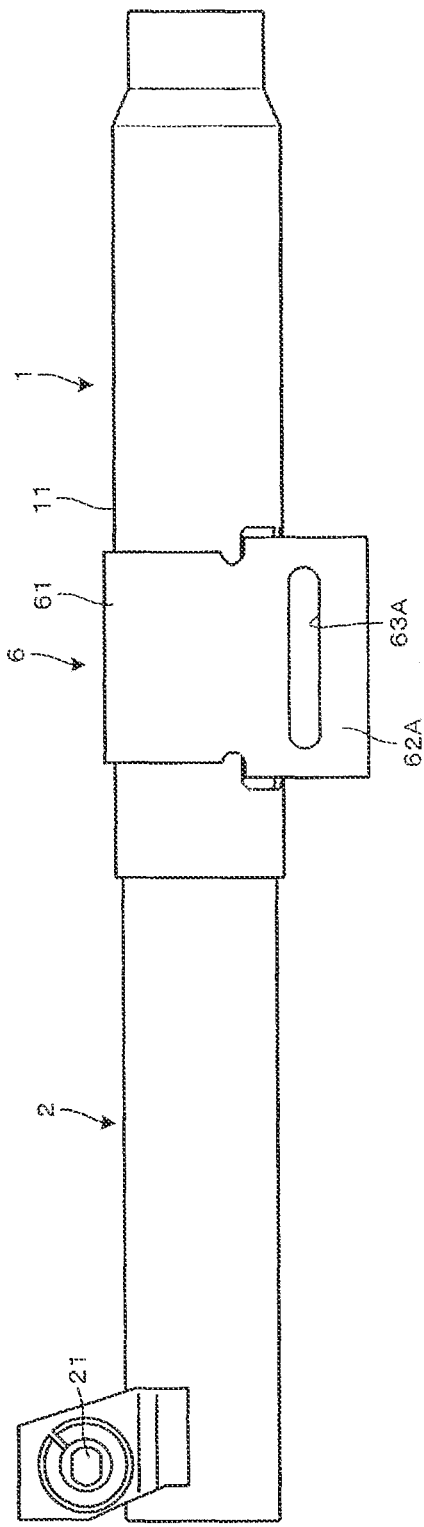
FIG. 4 is a front view illustrating the state of the steering apparatus in FIG. 2 with the vehicle installation bracket, steering shaft and clamp apparatus omitted.

As illustrated in FIG. 3, a pair of left and right flange sections 31A, 31B for attaching the upper-side vehicle installation bracket 3 to the vehicle 5 are formed on the upper portion of the upper-side vehicle installation bracket 3. A distance bracket 6 is held between the inside surfaces 321A, 321B of left and right side plates 32A, 32B that are integrally formed with the flange sections 31A, 31B and extend in the up-down direction such that this distance bracket 6 is able to move in the forward backward direction and up-down direction. In this example, the left and right side plates 32A, 32B are integrally formed with the flange sections 31A, 31B, however they could be formed as separate members.

The distance bracket 6 has a symmetrical shape with respect to a vertical plane that passes through the center axis line of the outer column 1, and is integrally formed in a U shape by bending rectangular steel plate. The arc shaped section 61 on the upper part of the distance bracket 6 fits around the outer circumferential surface 11 of the outer column 1, and is fastened to the outer circumferential surface 11 by welding. However, this arc shaped section 61 of the distance bracket 6 could be fastened around the outer circumferential surface 11 of the outer column 1 by another connecting means such as swaging, bolts, pins, rivets or the like.

Flat surface sections 62A, 62B that are parallel with the side plates 32A, 32B are formed so as to continuously extend downward from both lower ends of the arc shaped section 61 of the distance bracket 6. The flat sections 62A, 62B are held by the inside surfaces 321A, 321B of the left and right side plates 32A, 32B so that movement is possible in the forward-backward direction and up-down direction. Long grooves 63A, 63B for telescopic mechanism in the forward-backward direction (FIG. 2 to FIG. 5) that are long in the axial direction (direction orthogonal to the paper in FIG. 3) are formed in the flat surface sections 62A, 62B. A round rod shaped clamping rod 34 is inserted from the right side in FIG. 3 into through the long grooves 63A, 63B for tilt mechanism in the up-down direction (FIG. 2 and FIG. 3) that are formed in the side plates 32A, 32B and the long grooves 63A, 63B in the forward-backward direction. The long grooves 33A, 33B in the up-down direction are formed in an arc shape around the tilt center axis 21.

Bent sections 64A, 64B are formed in both ends of the flat surface sections 62A, 62B of the distance bracket 6 in the forward-backward direction of the vehicle. The bent sections 64A, 64B are bent at right angles toward the inside in the width direction of the vehicle from the flat surface sections 62A, 62B. Moreover, lower-side bent sections 65A, 65B are formed on the bottom end of the flat surface sections 62A, 62B along the entire length of the flat surface sections 62A, 62B in the forward-backward direction of the vehicle.

Figure 5:
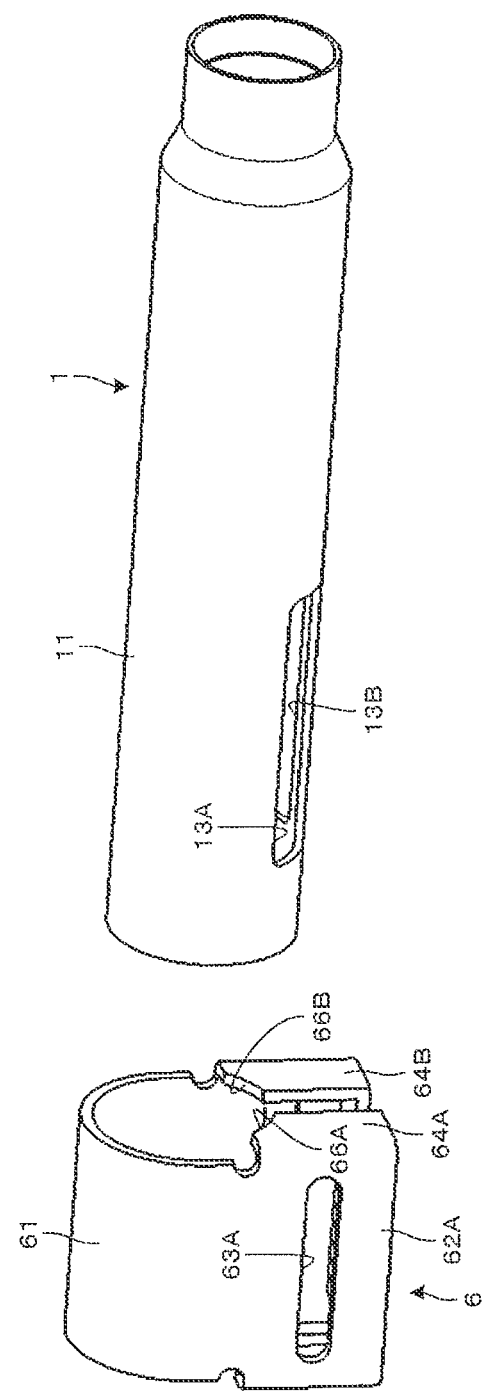
FIG. 5 is an exploded perspective view with the inner column omitted from the state illustrated in FIG. 4, and illustrates the state with the outer column and distance bracket separated.

A pair of left and right arc shaped clamping sections 66A, 66B are formed on the inside surface of the bent sections 64A, 64B in the width direction of the vehicle. As illustrated in FIG. 3 and FIG. 5, a pair of left and right through holes 13A, 13B through which the clamping sections 66A, 66B are inserted are formed in the outer column 1. The through holes 13A, 13B are formed so as to be long in the axial direction of the outer column 1. The clamping sections 66A, 66B are inserted through the through holes 13A, 13B, and these clamping sections 66A, 66B come in direct contact with the outer circumferential surface of the inner column 2. The clamping sections 66A, 66B is preferably formed such that the radius of the arc is the same or a little larger than the radius of the outer circumferential surface 22 of the inner column 2. The inner column 2 is fitted inside the inner circumferential surface of the outer column 1 so as to be able to slide in the axial direction. The shape of the clamping sections 66A, 66B is not limited to an arc shape, and could be a straight shape. Furthermore, the angle α of the center position of the area of contact between the clamping sections 66A, 66B and the outer circumferential surface 22 of the inner column 2 can be an arbitrary angle such as 90 degrees or 120 degrees.

As illustrated in FIG. 3, a head section 341 is formed on the right side of the clamping rod 34, and this head section comes in contact with the outside surface of the side plate 32B. A rotation stopper 342 that has a rectangular cross section having a width that is a little narrower than the groove width of the long groove 33B in the up-down direction is formed in the outer diameter section on the left side of the head section. The rotation stopper 342 fits inside the long groove 33B in the up-down direction, and together with stopping the rotation of the clamping rod 34 with respect to the upper-side vehicle installation bracket 3, it causes the clamping rod 34 to slide along the long groove 33B in the up-down direction when adjusting the position of the steering wheel 103 in the up-down direction.

A stationary cam 343, a movable cam 344, a thrust bearing 345, and an adjustment nut 346 are fitted in that order around the outer circumferential surface on the left end of the clamping rod 34, and female threads that are formed on the inner diameter section of the adjustment nut 346 are screwed onto male threads 347 that are formed on the left end of the clamping rod 34. An operation lever 349 is fastened to the left end surface of the movable cam 344, and a cam lock mechanism is formed by the movable cam 344 and the stationary cam 343 that are integrally operated by the operation lever 349. The stationary cam 343 engages with the long groove 33A in the up-down direction, and does not rotate with respect to the upper-side vehicle installation bracket 3, and this stationary cam 343 is caused to slide along the long hole 33A in the up-down direction when adjusting the position of the steering wheel 103 in the up-down direction.

When securing the steering wheel 103 in a desired position using the tilt and telescopic mechanism, by rotating the operation lever 349, which runs the peak of the movable cam 344 over the peak of the stationary cam 343, and pushes the stationary cam 343 to the right side in FIG. 3, while at the same time pulling the clamping rod to the left in FIG. 3, the side plates 32A, 32B are clamped. The inside surfaces 321A, 321B of the side plates 32A, 32B clamp the flat surface sections 62A, 62B of the distance bracket 6. The flat surface sections 62A, 62B elastically deform toward the inside in the width direction of the vehicle, and the pair of left and right clamping sections 66A, 66B of the bent sections 64A, 64B directly clamp the outer circumferential surface 22 of the inner column 2 from both the left and right sides.

On the other hand, when releasing the secured steering wheel 103, by rotating the operation lever 349 in the opposite direction, the valley of the movable cam 344 moves over the peak of the stationary cam 343 and thus the force pushing the stationary cam 343 toward the right side is released, while at the same time the force pulling the clamping rod 34 to the left side is also released. As a result, the side plates 32A, 32B separate, the elastic deformation of the flat surface sections 62A, 62B is released, and the clamping force by the clamping sections 66A, 66B is released.

In this way, by moving the outer column 1 and the distance bracket 6 in a specified range by the tilt and telescopic function, the steering wheel 103 can be moved to a desired position in the up-down direction and forward-backward direction. More specifically, after the distance bracket 6 and inner column 2 have been released from being clamped by the upper-side vehicle installation bracket 3, the steering wheel 103 is gripped and the outer column 1 is moved in the axial direction with respect to the inner column 2 to adjust the steering wheel to a desired position in the forward-backward direction. When doing this, the distance bracket 6 is guided by the clamping rod 34, and moved in the axial direction together with the outer column 1. Moreover, the steering wheel 103 is gripped, and the distance bracket 6 and outer column 1 are adjusted to a desired position in the up-down direction about the tilt shaft 21. After that, the distance bracket 6 and inner column 2 are clamped by the upper-side vehicle installation bracket 3.

In this example, the pair of left and right clamping sections 66A, 66B of the distance bracket 6 directly clamp the outer circumferential surface 22 of the inner column 2 from both the left and right sides. Therefore, the balance between the left and right clamping forces is good, and there is no fluctuation in the clamping force by which the outer column 1 clamps the inner column 2 depending on the forward-backward position of the steering wheel 103. Moreover, the top side of the distance bracket 6 is fastened to the outer circumferential surface 11 of the outer column 1, and clamping sections 66A, 66B for clamping the outer circumferential surface 22 of the inner column 2 are formed on the bottom side of the distance bracket 6, so the construction of the distance bracket 6 is simple, and it is possible to reduce manufacturing costs.

Example 2

Figure 6:
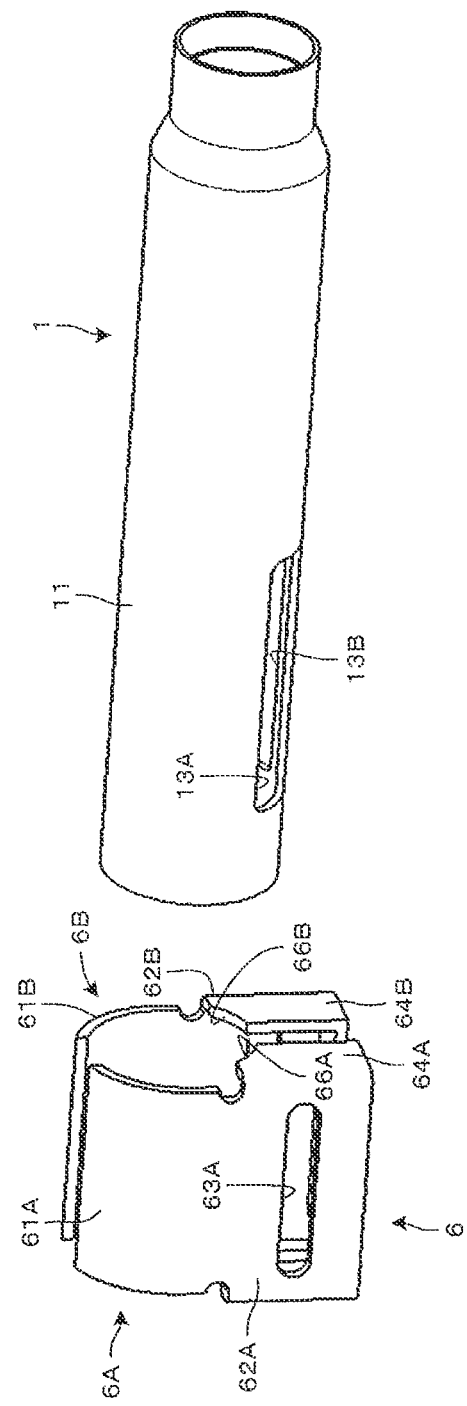
FIG. 6 is an exploded perspective view of a steering apparatus of a second example of an embodiment of the present invention, and is similar to FIG. 5.

FIG. 6 is an exploded perspective view of a steering apparatus of a second example of an embodiment of the present invention, and illustrates the separated state of the outer column 1 and distance bracket 6, similar to FIG. 5 of the first example. In the explanation below, the same reference numbers are given to parts and elements that are the same as in the first example, and redundant explanations are omitted so that only the parts that differ from the first example are explained.

Differing from the distance bracket 6 in the first example that was integrally formed, in this second example, the distance bracket 6 is constructed by two separate parts. In other words, as illustrated in FIG. 6, the distance bracket 6 of this example is composed of a left distance bracket 6A and a right distance bracket 6B. The left distance bracket 6A and the right distance bracket 6B have a symmetrical shape with respect to a vertical plate that passes through the center axis of the outer column 1, and are formed by bending steel rectangular plate. The upper part of left distance bracket 6A and the right distance bracket 6B is arc shaped sections 61A, 61B that fit around the outer circumferential surface 11 of the outer column 1, and are fastened to the outer circumferential surface 11 by welding.

Flat surface sections 62A, 62B that are parallel with the side plates 32A, 32B are formed in the lower part of the left distance bracket 6A and the right distance bracket 6B. The flat surface sections 62A, 62B are held by the side surfaces 321A, 321B of the left and right side plates 32A, 32B so as to be able to move in the forward-backward direction and the up-down direction.

Bent sections 64A, 64B are formed in the flat surface section 62A of the left distance bracket 6A and in the flat surface section 62B of the right distance bracket 6B on both ends of the flat surface sections 62A, 62B in the forward-backward direction of the vehicle. The bent sections 64A, 64B are bent at right angles from the flat surface sections 62A, 62B toward the inside in the width direction of the vehicle. Moreover, as in the first example, bottom-side bent sections 65A, 65B are formed on the bottom end of the flat surface sections 62A, 62B along the entire length of the flat surface sections 62A, 62B in the forward-backward direction of the vehicle.

A pair of left and right arc shaped clamping sections 66A, 66B is formed on the inside surfaces in the width direction of the vehicle of the bent sections 64A, 64B. A pair of left and right through holes 13A, 13B through which the clamping sections 66A, 66B are inserted is formed in the outer column 1. The through holes 13A, 13B are formed so as to be long in the axial direction of the outer column 1. The clamping sections 66A, 66B are inserted through the through holes 13A, 13B, and as in the first example, the clamping sections 66A, 66B directly clamp the outer circumferential surface of the inner column 2. The construction and effect of the other parts of the second example are the same as in the first example.

Example 3

Figure 7:
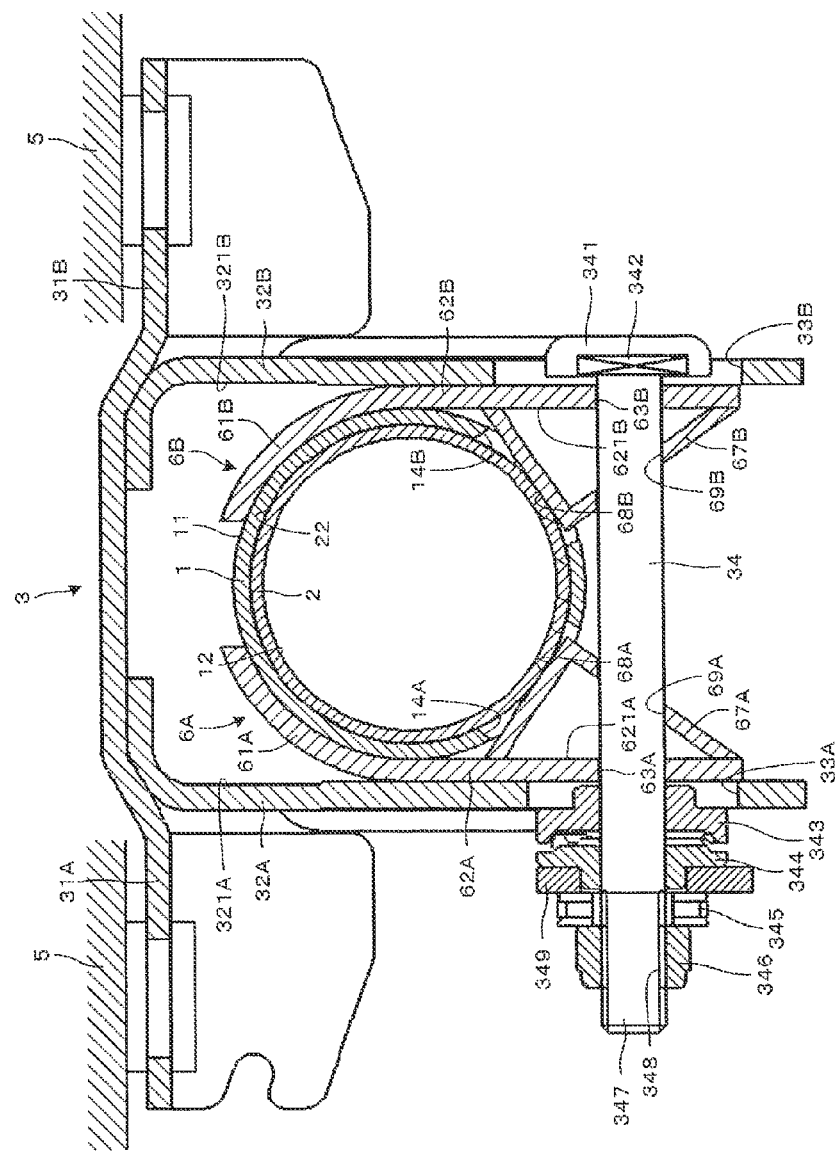
FIG. 7 is a cross-sectional view of a steering apparatus of a third example of an embodiment of the present invention, and is similar to FIG. 3.
Figure 8:
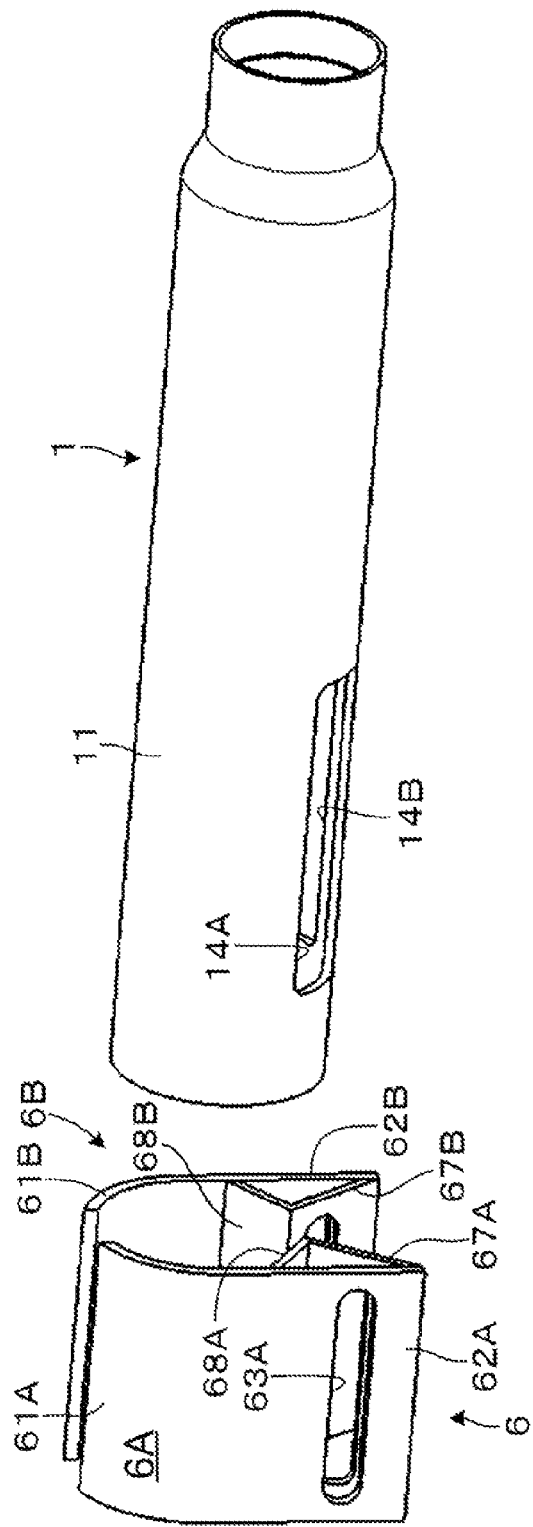
FIG. 8 is an exploded perspective view of a third example of a steering apparatus, and is similar to FIG. 5.

FIG. 7 and FIG. 8 illustrate a steering apparatus of a third example of an embodiment of the present invention. In the explanation below, the same reference numbers will be used for parts and elements that are the same as in the first embodiment, and any redundant explanations will be omitted such that only the portions that differ from the first example will be explained.

In this example, together with forming left and right clamping sections 68A, 68B of the distance bracket 6 as separate parts, the rigidity of the clamping sections 68A, 68B has been increased. In this example as well, the distance bracket 6 is composed of a left distance bracket 6A and a right distance bracket 6B, with the upper portions of each being arc shaped sections 61A, 61B that fit around the outer circumferential surface 11 of the outer column 1, and fastened to the outer circumferential surface 11 by welding. Flat surface sections 62A, 62B that are parallel with the side plates 32A, 32B are formed on the lower portion of the left distance bracket 6A and the right distance bracket 6B. The flat surface sections 62A, 62B are held between the inside surfaces 321A, 321B of the left and right side plates 32A, 32B so as to be able to move in the forward-backward direction and up-down direction.

Long grooves 63A, 63B in the forward-backward direction that is long in the axial direction (direction orthogonal to the paper surface in FIG. 7) are formed in the flat surface sections 62A, 62B.

Bent sections 67A, 67B that are bent into a peaked shape toward the inside in the width direction of the vehicle are fastened to the inside surface 621A of the flat surface section 62A and the inside surface 621B of the flat surface section 62B at two locations in the up-down direction by welding. The bent sections 67A, 67B are formed along the entire length of the flat surface section 62A and flat surface section 62B in the forward-backward direction of the vehicle. The bent sections 67A, 67B extend diagonally upward from the bottom end section of the inside surfaces 621A, 621B of the flat surface sections 62A, 62B, and the inclined surfaces that are formed on top surfaces of the portions on upper side (side closest to the inner column 2) that bend and extend outward function as straight clamping sections 68A, 68B.

A pair of left and right through holes 14A, 14B through which the clamping sections 68A, 68B are inserted is formed in the outer column 1. The through holes 14A, 14B are formed so as to be long in the axial direction of the outer column 1. The clamping sections 68A, 68B are inserted through the through holes 14A, 14B, and these clamping sections 68A, 68B directly clamp the outer circumferential surface 22 of the inner column 2. Flat surface sections that face the clamping sections 68A, 68B are formed on the outer circumferential surface 22 of the inner column 2, and when the clamping sections 68A, 68B have clamped the outer circumferential surface 22 of the inner column 2, these flats surfaces can come in contact with each other.

Long grooves 69A, 69B in the forward-backward direction having the same shape as the long holes 63A, 63B in the forward-backward direction of the flat surface sections 62A, 62B are formed in the inclined surfaces of the bent sections 67A, 67B on the lower side (side far from the inner column 2) of the vehicle. A circular rod shaped clamping rod 34 is inserted from the right side in FIG. 7 through the long grooves 33A, 33B in the up-down direction that are formed in the side plates 32A, 32B and the long holes 63A, 63B, 69A, 69B in the forward-backward direction.

In this example as well, the clamping section 68A of the left distance bracket 6A and the clamping section 68B of the right distance bracket 6B directly clamp the outer circumferential surface 22 of the inner column 2 from both the left and right sides. Therefore, left and right balance of the clamping force is good, and there is no fluctuation in the clamping force by which the outer column 1 clamps the inner column 2 depending on the forward-backward position of the steering wheel 103. Particularly, the clamping sections 68A, 68B that clamp the outer circumferential surface 22 of the inner column 2 are formed by the bent sections 67A, 67B of the distance brackets 6A, 6B that are bent into a peak shape along the entire length in the forward-backward direction of the vehicle, so the rigidity of the clamping sections 68A, 68B is increased and thus it is possible to increase the clamping force. The construction and effect of the other parts of this third example are the same as in the first and second examples.

Example 4

Figure 9:
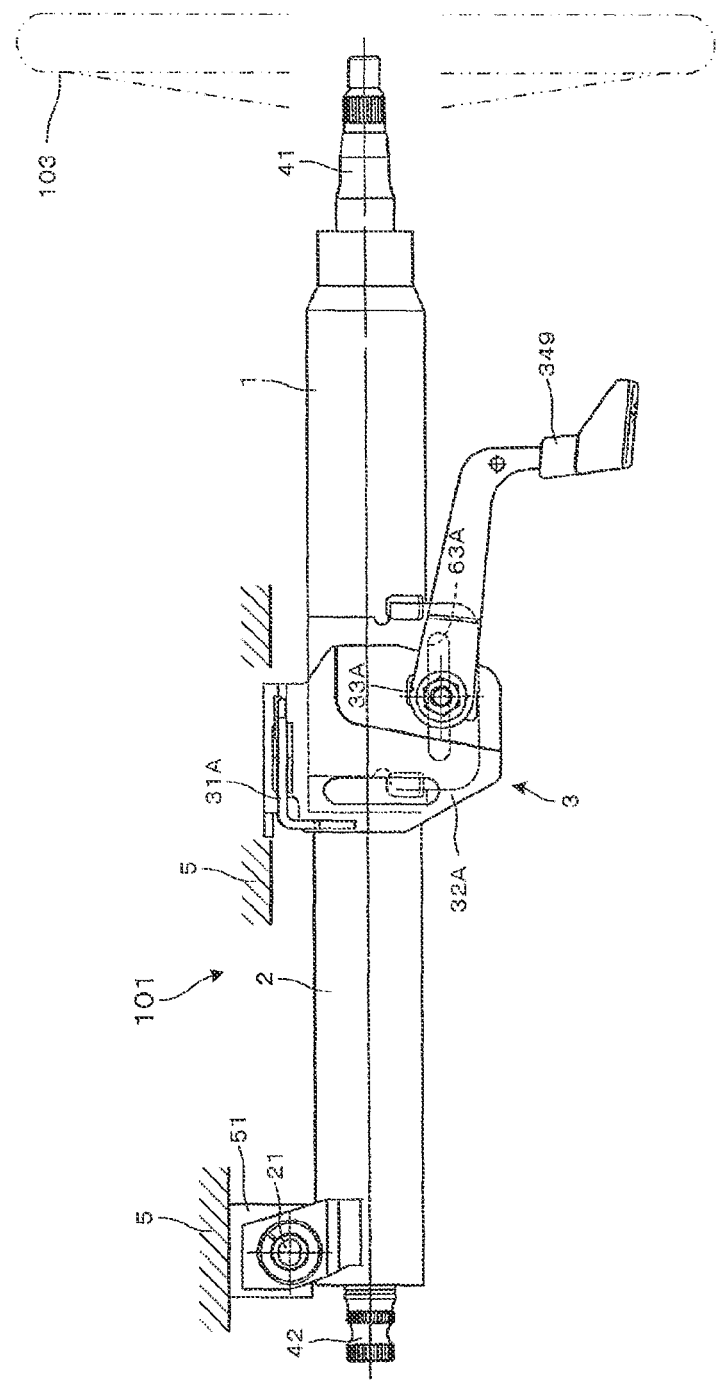
FIG. 9 is a front view illustrating the main parts of a steering apparatus of a fourth example of an embodiment of the present invention.
Figure 10:
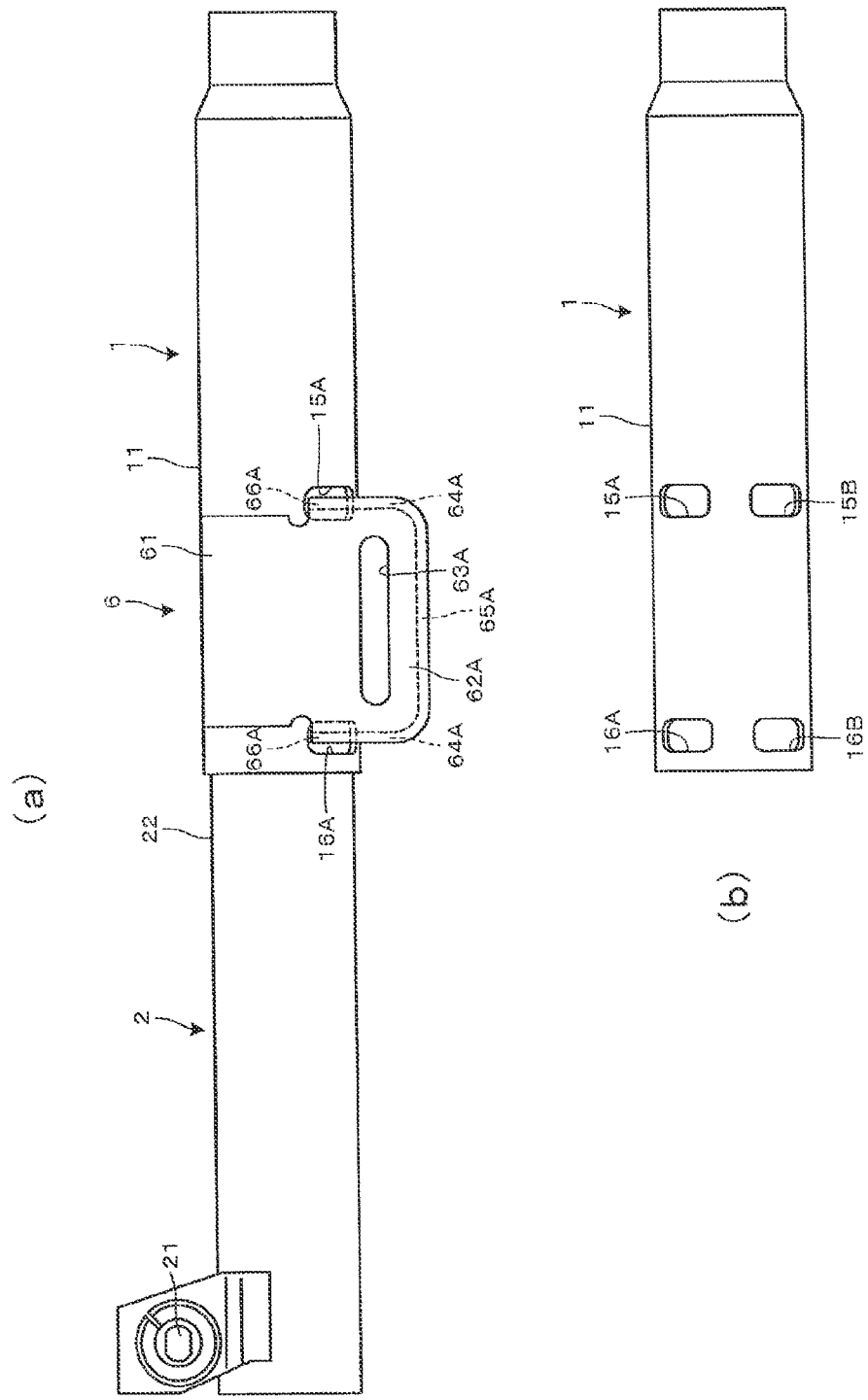
FIG. 10A is a front view illustrating the state of the steering apparatus in FIG. 9 with the vehicle installation bracket, steering shaft, and clamp apparatus omitted.
FIG. 10B is a bottom view of just the outer column illustrated in FIG. 10A as seen from the bottom side of the vehicle.
Figure 11:
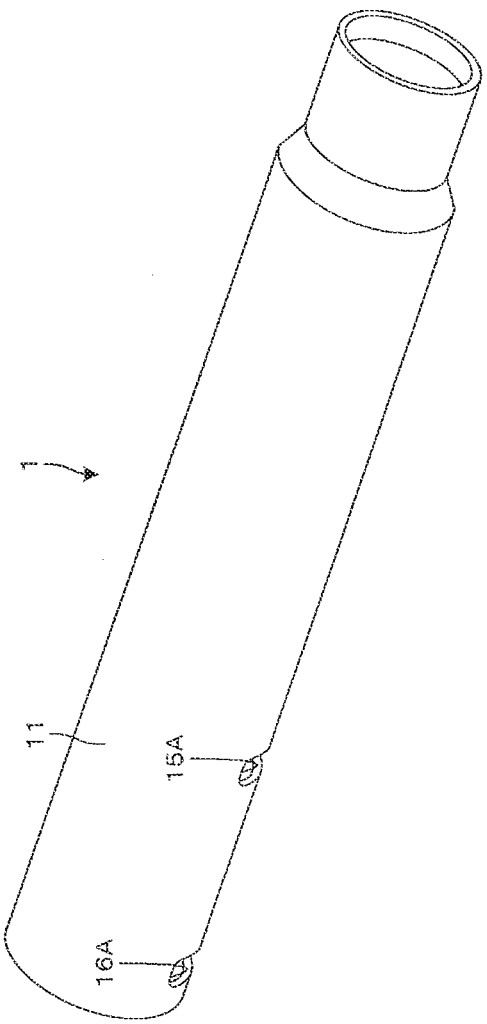
FIG. 11 is an exploded perspective view of the state illustrated in FIG. 10A with the inner column omitted, and illustrates the separated state of the outer column and distance bracket.
Figure 11:
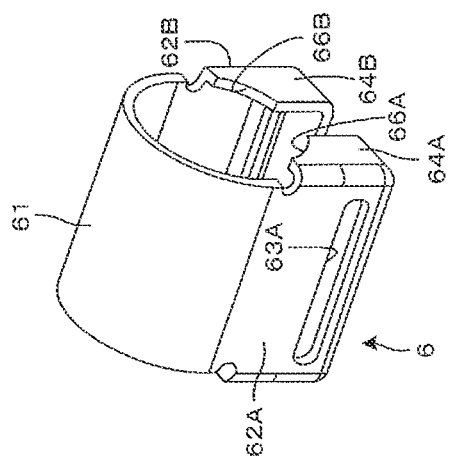

FIG. 9 to FIG. 11 illustrate a steering apparatus of a fourth example of an embodiment of the present invention. In the following explanation, the same reference numbers are given to parts and elements that are the same as in the first example, and any redundant explanations are omitted, so that only the portions that differ from the first example will be explained.

In this example, instead of forming through holes that are long in the axial direction of the outer column 1, the through holes will be divided into two, on the side toward the front of the vehicle and on the side toward the rear of the vehicle, and the lengths in the axial direction will be short. In other words, the distance bracket 6 of this example has the same shape as in the first example. However, it is also possible to divide the distance bracket 6 into a left distance bracket and a right distance bracket as in the second example.

Bent sections 64A, 64B that are end at right angles toward the inside in the width direction of the vehicle are formed on both ends of the distance bracket 6 in the forward-backward direction of the vehicle, and a pair of left and right arc shaped clamping sections 66A, 66B are formed on the inside surfaces of the bent sections 64A, 64B in the width direction of the vehicle. As illustrated in FIGS. 10A, 10B and FIG. 11, a pair of left and right through holes 15A, 15B though which the clamping sections 66A, 66B on the side toward the rear of the vehicle are inserted, and a pair of left and right through holes 16A, 16B through which the clamping sections 66A, 66B on the side toward the front of the vehicle are inserted are formed in the outer column 1. The through holes 15A, 15B, 16A, 16B are formed so as to be short in the axial direction of the outer column 1, and are formed such that the dimensions are a little larger than the thickness of the clamping sections 66A, 66B in the forward-backward direction of the vehicle.

The clamping sections 66A, 66B are inserted through the through holes 15A, 15B, 16A, 16B, and these clamping sections 66A, 66B directly clamp the outer circumferential surface 22 of the inner column 2. In this example, the through holes 15A, 15B, 16A, 16B are formed so as to be short in the axial direction of the outer column 1. Therefore, the surface area of the openings of the through holes is kept small, so it is possible to increase the rigidity of the outer column 1, and thus the operational feeling of the steering apparatus is improved. The construction and effect of the other parts of this fourth example are the same as in the first example.

Example 5

Figure 12:
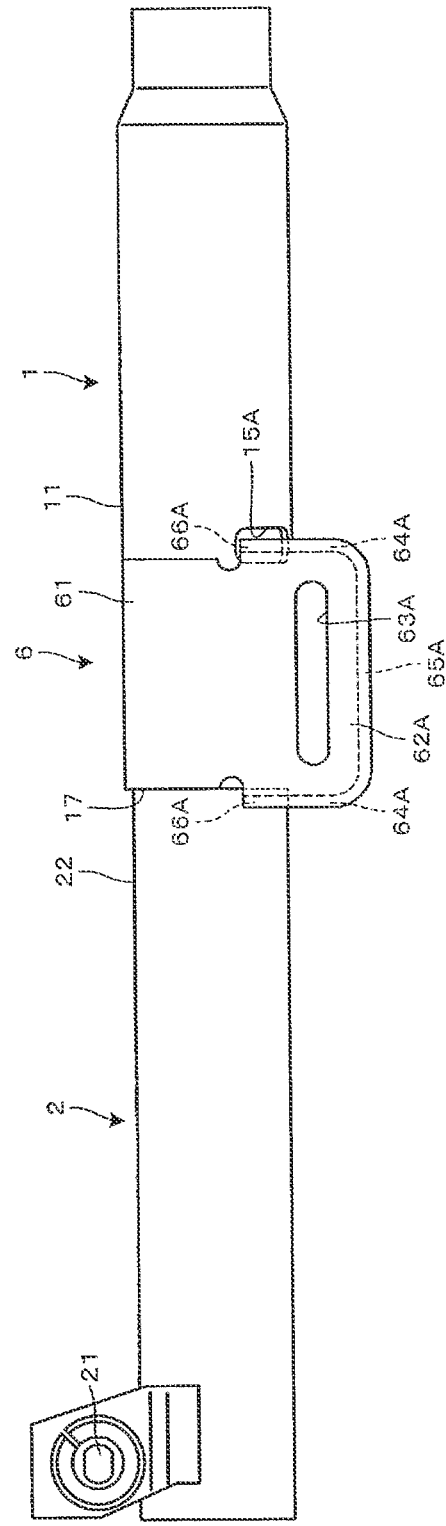
FIG. 12 is a front view of a steering apparatus of a fifth example of an embodiment of the present invention, and illustrates the state with the vehicle installation bracket, steering shaft and clamp apparatus omitted.
Figure 13:
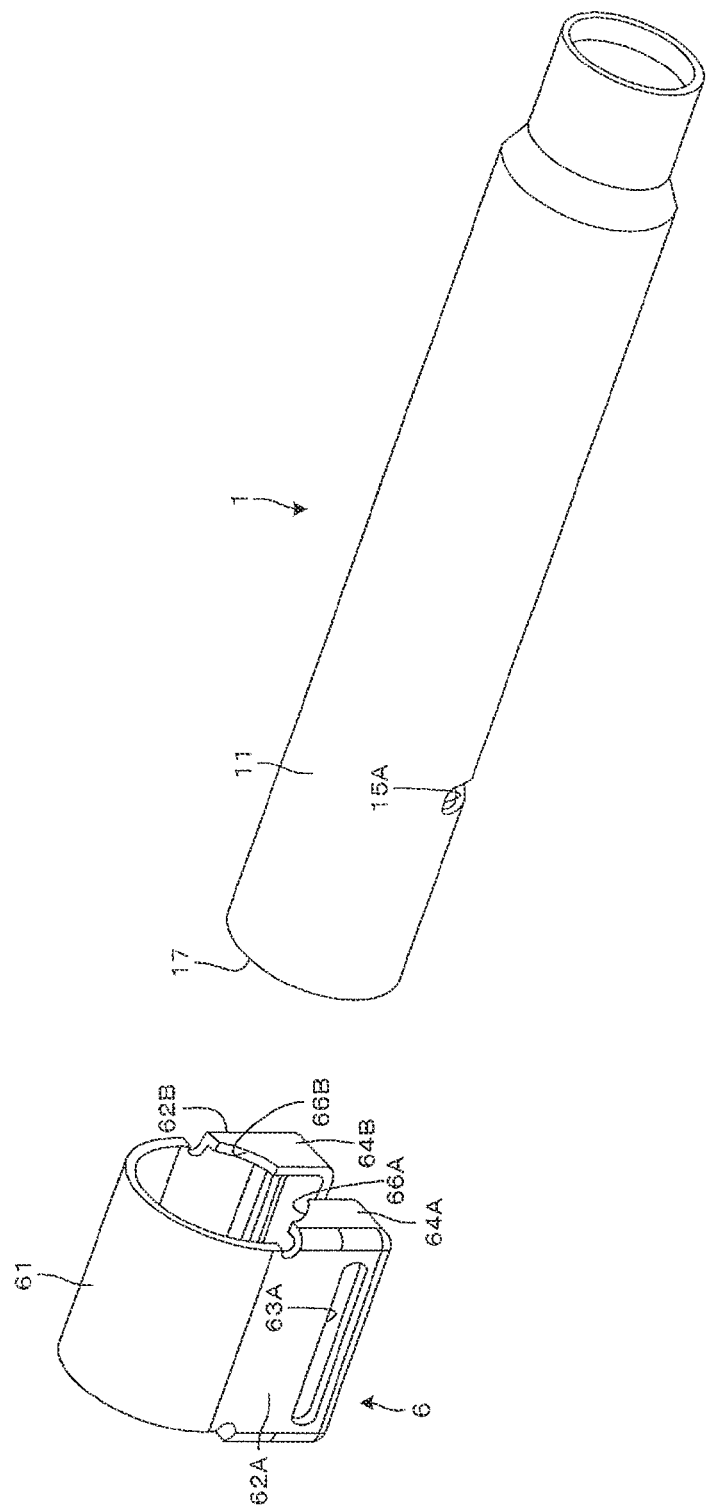
FIG. 13 is an exploded perspective view of the state in FIG. 12 with the inner column omitted, and illustrates the separated state of the outer column and distance bracket.

FIG. 12 and FIG. 13 illustrated a steering apparatus of a fifth example of an embodiment of the present invention. In the following explanation, the same reference numbers are used for parts and elements that are the same as in the first example, and any redundant explanations are omitted, so that only the portions that differ from the first example are explained.

In this example, a through hole 15A that is short in the axial direction is formed at only one location on the side toward the rear of the vehicle. In other words, the distance bracket 6 of this example has the same shape as in the first example. However, in this example as well, the distance bracket could be divided into a left distance bracket and a right distance bracket as in the second example.

In this example, only a pair of left and right holes 15A, 15B through which the clamping sections 66A, 66B on the side toward the rear of the vehicle are inserted is formed. The clamping sections 66A, 66B on the side toward the front of the vehicle are located further toward the front side of the vehicle than the end surface 17 of the outer column 1 on the side toward the front of the vehicle. The through holes 15A, 15B are formed so as to be short in the axial direction of the outer column 1, and are formed such that the dimension is a little larger than the thickness of the clamping sections 66A, 66B on the side toward the rear of the vehicle in the forward-backward direction of the vehicle.

The clamping sections 66A, 66B on the side toward the rear of the vehicle are inserted in the through holes 15A, 15B, and these clamping sections 66A, 66B on the side toward the rear of the vehicle directly clamp the outer circumferential surface 22 of the inner column 2. Moreover, the clamping sections 66A, 66B on the side toward the front of the vehicle directly clamp the outer circumferential surface 22 of the inner column 2 with out being inserted through some through holes. In this example, through holes 15A, 15B are only formed at one location on the side toward the rear of the vehicle, so it is possible to make the length of the holes in the axial direction of the outer column 1 short, and thus the collapse stroke of the outer column 1 during a collision can be made to be long. Furthermore, the through holes 15A, 15B on the side toward the rear of the vehicle are formed so as to be short in the axial direction of the outer column 1, so it is possible to keep the surface area of the openings of the through holes small, and thus the rigidity of the outer column 1 is increased and the operational feeling of the steering apparatus is improved. The construction and effect of the other parts of this fifth example are the same as in the first example.

Example 6

Figure 14:
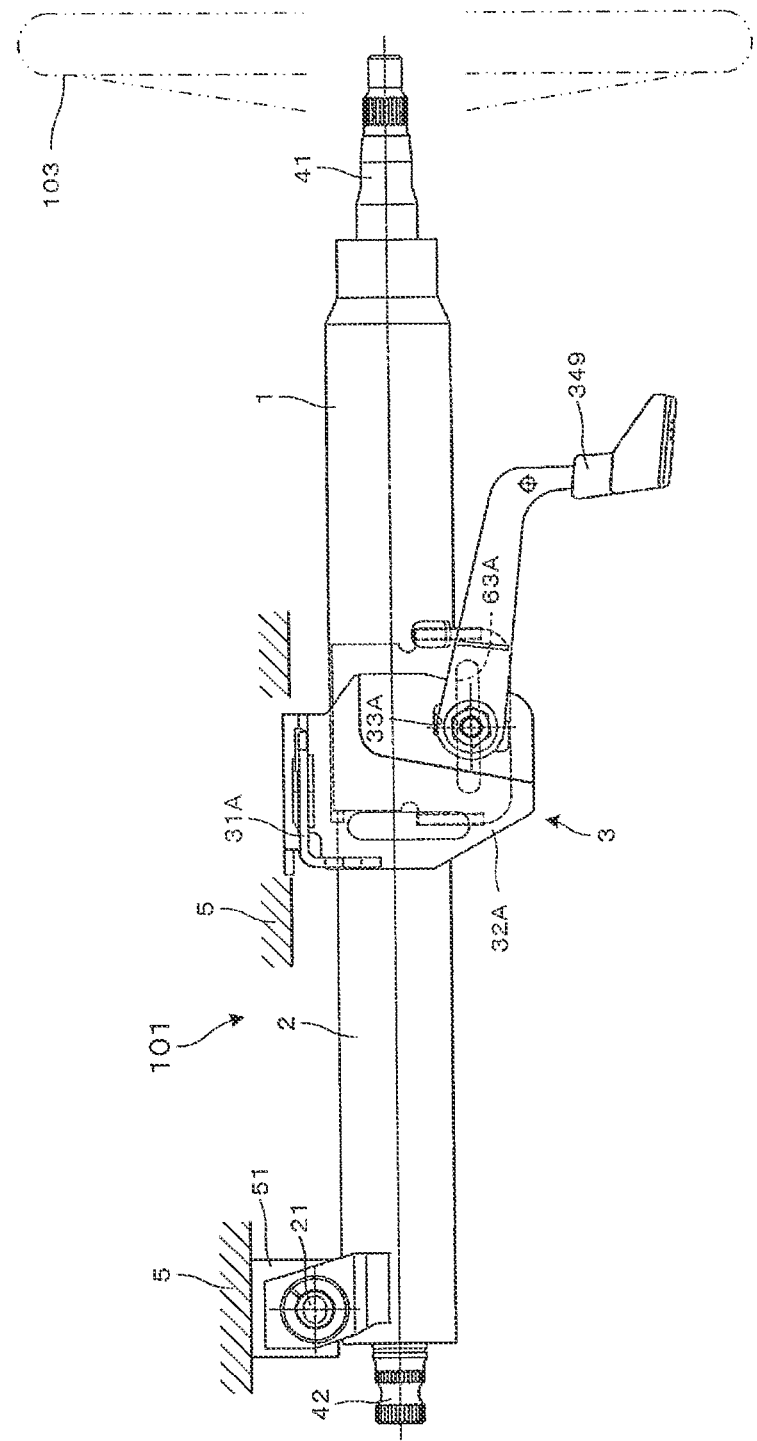
FIG. 14 is a front view illustrating the main parts of a steering apparatus of a sixth example of an embodiment of the present invention.
Figure 15:
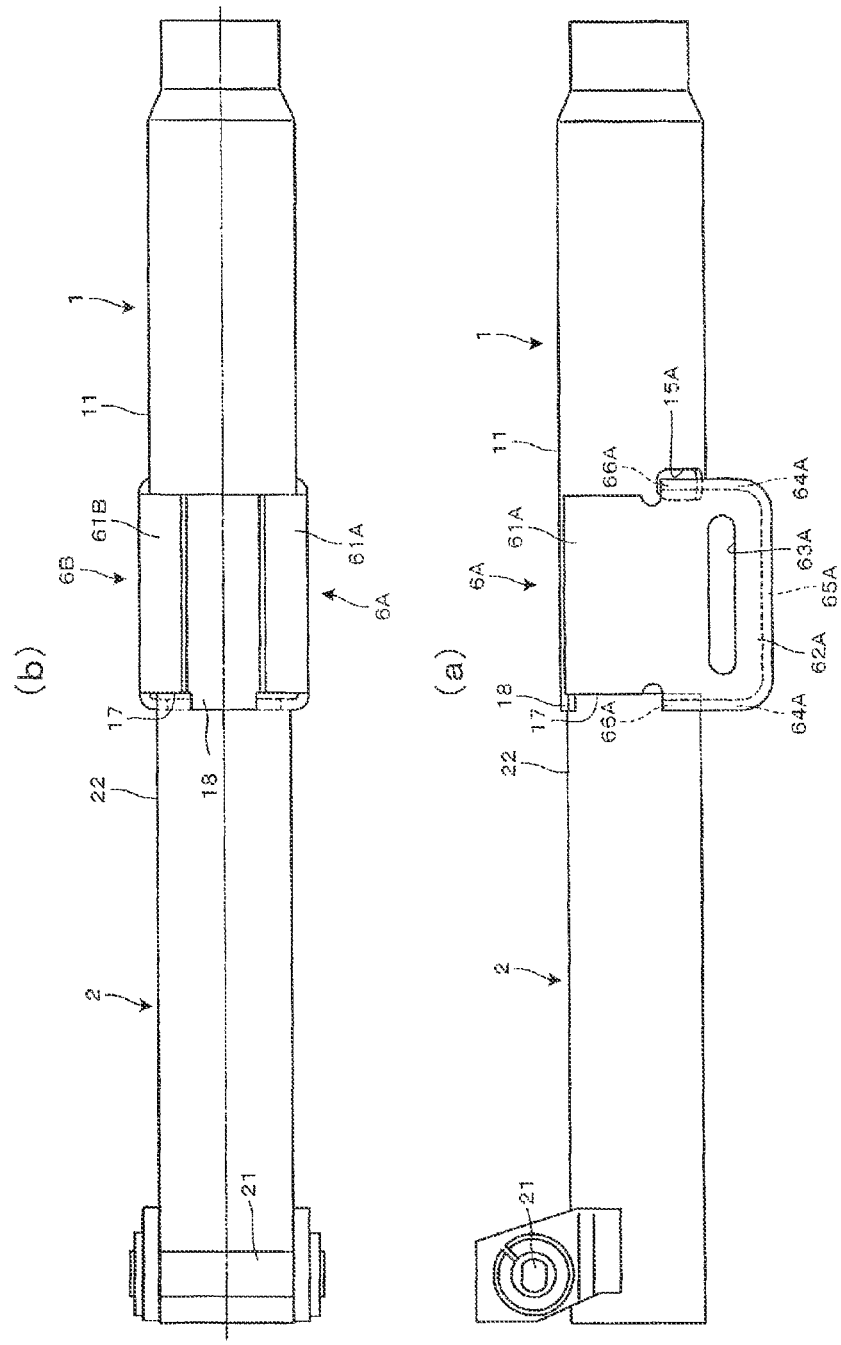
FIG. 15A is a front view illustrating the state of the steering apparatus in FIG. 14 with the vehicle installation bracket, steering bracket and clamp apparatus omitted.
FIG. 15B is a top view of FIG. 15A.
Figure 16:
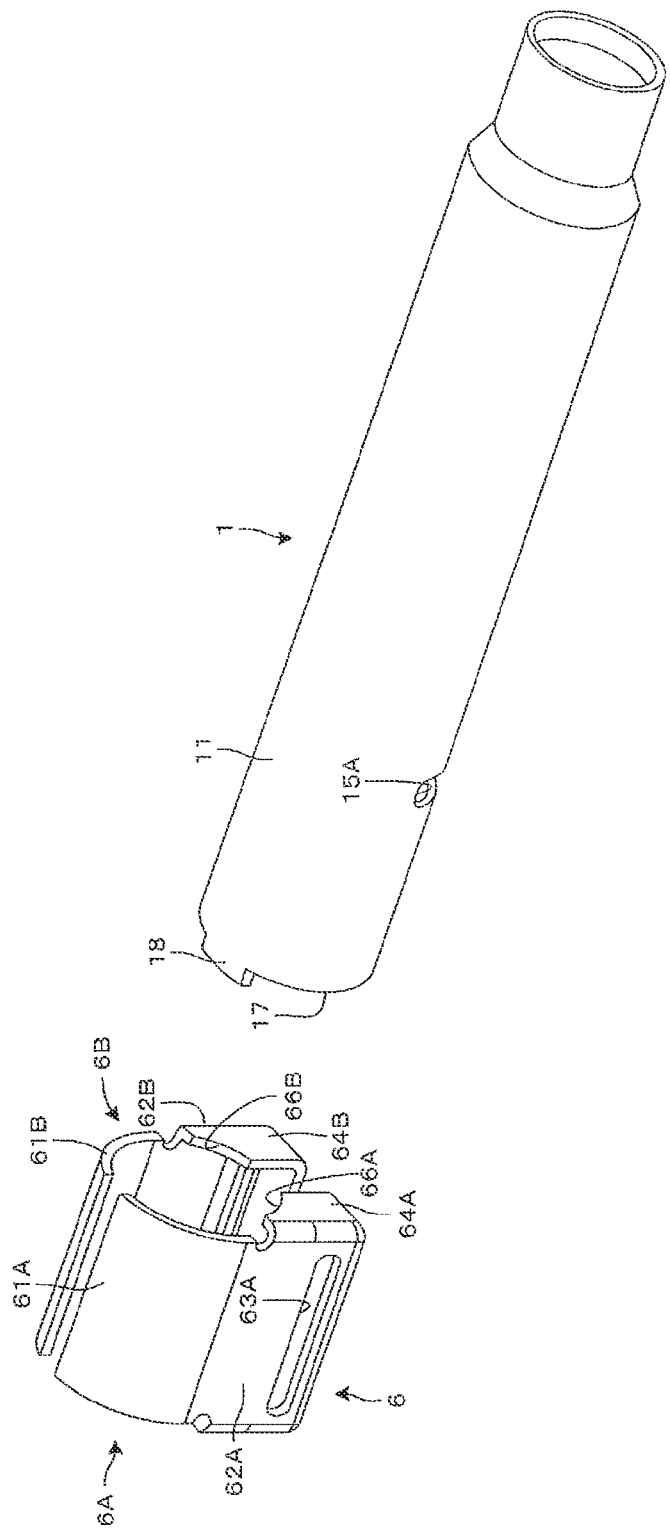
FIG. 16 is an exploded perspective view of the state in FIG. 15 with the inner column omitted, and illustrates the separated state of the outer column and distance bracket.

FIG. 14 to FIG. 16 illustrate a steering apparatus of a sixth example of an embodiment of the present invention. In the following explanation, the same reference numbers are given to parts and elements that are the same as in the first and fifth examples, and any redundant explanations are omitted so that only the portions that differ from the first and fifth examples are explained.

This example is an example wherein a through hole 15A that is short in the axial direction is formed at only one location on the side toward the rear of the vehicle, and the holding force when clamping the inner column 2 by the outer column 1 is improved. In other words, the distance bracket 6 of this example had the same shape as the distance bracket 6 that is divided in two in the second example, and is composed of a left distance bracket 6A and a right distance bracket 6B. However, the distance bracket 6 could also be integrally formed as in the first and fifth examples.

In this example, only a pair of left and right through holes 15A, 15B through which the clamping sections 66A, 66B on the side toward the rear of the vehicle are inserted are formed in the outer column 1. The clamping sections 66A, 66B on the side toward the front of the vehicle are located further toward the front side of the vehicle than the end surface 17 of the outer column 1 toward the front side of the vehicle. The through holes 15A, 15B are formed so as to be short in the axial direction of the outer column 1, and are formed such that the dimensions are a little larger than the thickness of the clamping sections 66A, 66B on the side toward the rear of the vehicle in the forward-backward direction of the vehicle.

In this example, a load receiving section 18 that protrudes to the side toward the front of the vehicle from the end surface 10 on the side toward the rear of the vehicle is formed on the side toward the top of the vehicle of the end surface 17 of the outer column 1 on the side toward the front of the vehicle. In this example, when the clamping sections 66A, 66B on the side toward the front of the vehicle clamp the outer circumferential surface 22 of the inner column 2, a load acts on the inner column 2 in a direction toward the upper side of the vehicle. The load receiving section 18 supports this load in the direction toward the upper side of the vehicle, so the holding force when the inner column 2 is clamped on the outer column 1 is improved. The construction and effect of the other parts of this sixth example are the same as in the first example and fifth example.

Seventh Example

Figure 17:
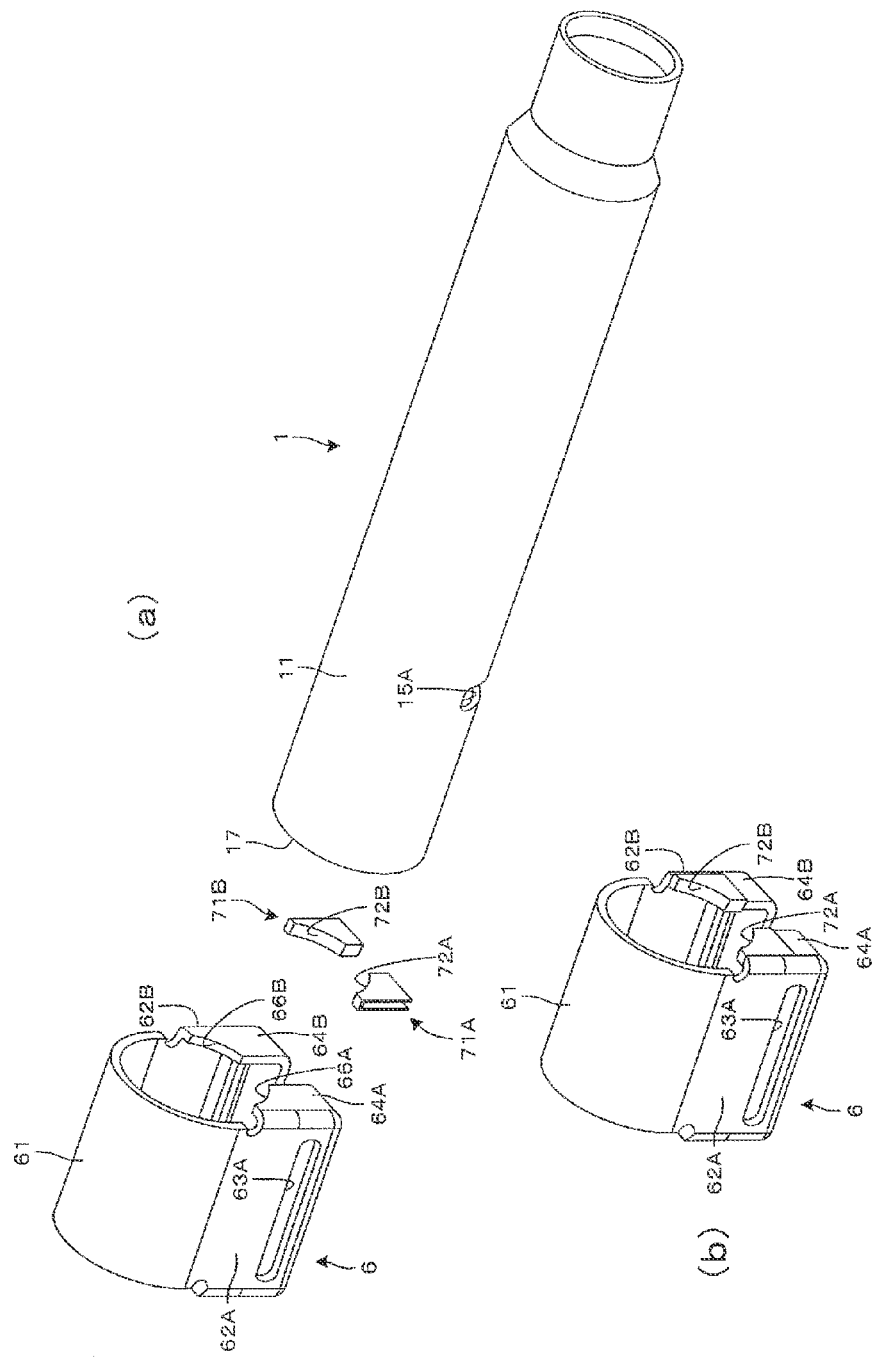
FIG. 17A is an exploded perspective view of a steering apparatus of a seventh example of an embodiment of the present invention.
FIG. 17B is a perspective view illustrating the state wherein synthetic resin member is assembled in the distance bracket.

FIGS. 17A and 17B illustrate a steering apparatus of a seventh example of an embodiment of the present invention. In the following explanation, the same reference numbers are used for parts and elements that are the same as in the first example and fifth example, and any redundant explanation will be omitted so that only the portions that differ from the first example and fifth example are explained.

This example is an example wherein the clamping sections 66A, 66B of the distance bracket 6 are covered with a resin member. In other words, as illustrated in FIGS. 17A and 17B, the distance bracket 6 of this example has the same shape as in the first example. However, in this example as well, a distance bracket 6 that has been divided into two could be used. Bent sections 64A, 64B are formed on both ends in the forward-backward direction of the vehicle. As illustrated in FIG. 17B, in this example, synthetic resin members 71A, 71B are placed over the bent section 64A, 64B on both ends in the forward-backward direction of the vehicle, and the clamping sections 66A, 66B. Arc shaped clamping sections 72A, 72B are formed on the inside surfaces in the width direction of the vehicle of the resin members 71A, 71B. The clamping sections 72A, 72B of the resin members 71A, 71B directly clamp the outer circumferential surface 22 of the inner column 2.

In this example, the outer circumferential surface 22 of the inner column 2 is clamped by way of the clamping sections 72A, 72B of the resin members 71A, 71B, so the friction coefficient is reduced, so adjustment of the forward-backward position of the steering wheel 103 can be performed smoothly. Moreover, displacement (collapsing movement) in the forward direction of the outer column during a secondary collision is performed smoothly, so the impact energy absorbing performance is stable.

Example 8

Figure 18:
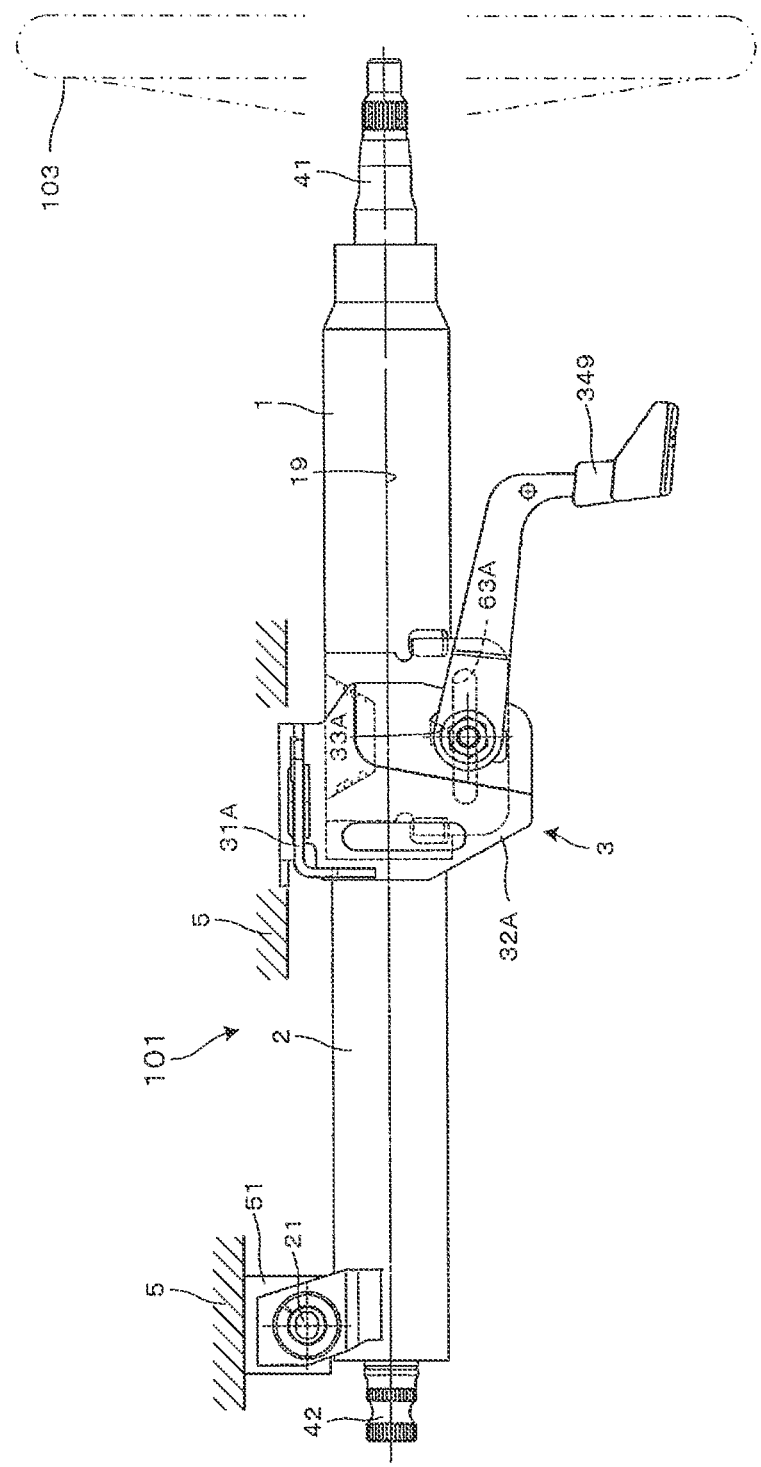
FIG. 18 is a front view illustrating the main parts of a steering apparatus of an eighth example of an embodiment of the present invention.
Figure 19:
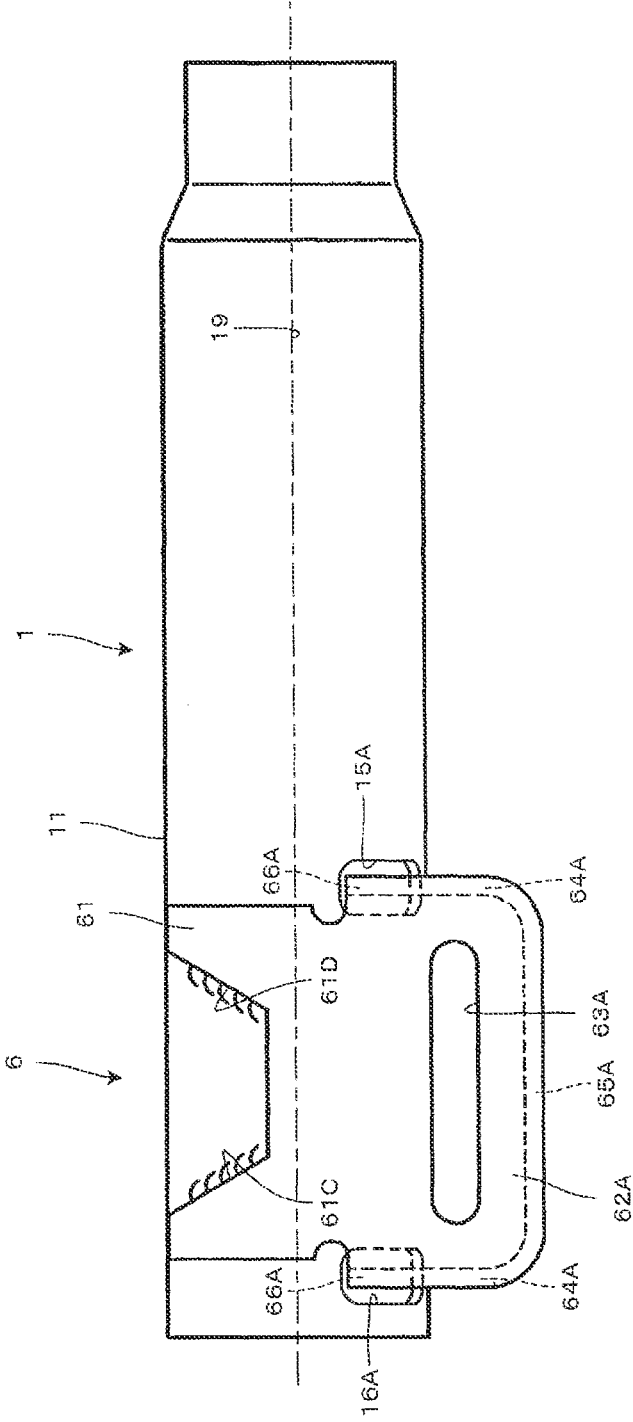
FIG. 19 is a front view illustrating the outer column of the steering apparatus in FIG. 18.

FIG. 18 and FIG. 19 illustrate a steering apparatus of an eighth example of an embodiment of the present invention. In the following explanation, the same reference numbers are used for parts and elements that are the same as in the first and fourth examples, and any redundant explanations are omitted so that only the portions that differ from the first example and fourth example are explained.

This example is an example wherein when welding the distance bracket 6 to the outer column 1, the lengthwise direction of the weld is inclined with respect to the center axis line of the outer column 1. In other words, inclined edges 61C, 61D that are inclined with respect to the center axis line 19 of the outer column 1 are formed in the upper arc shaped section 61 of the distance bracket 6 of this example. The arc shaped section 61 is fitted around the outer circumferential surface 11 of the outer column 1, and the inclined edges 61C, 61D are welded and fastened to the outer circumferential surface 11. Therefore, when the distance bracket 6 is welded to the outer column 1, the lengthwise direction of the weld is formed so as to be inclined with respect to the center axis line of the outer column 1.

When welding is performed such that the lengthwise direction of the weld is parallel with or orthogonal to the center axis line 19 of the outer column 1, the outer column thermally deforms after welding due to the welding heat, and the inner circumferential surface 12 of the outer column 1 may be deformed into an elliptical shape, or warp in the axial direction may occur in the outer column 1. When the outer column 1 thermally deforms, it becomes impossible to smoothly adjust the forward-backward position of the steering wheel 103, so processing to correct the deformation of the outer column 1 after welding becomes necessary, which increases the manufacturing cost. However, in this example, the lengthwise direction of the weld when welding the distance bracket 6 to the outer column 1 is inclined with respect to the center axis line 19 of the outer column 1, so deformation of the inner circumferential surface 12 of the outer column 1 to an elliptical shape or warping in the axial direction of the outer column 1 is suppressed, so the correction process can be omitted, and thus it is possible to keep the manufacturing cost from rising. The construction and effect of the other parts of this eighth example are the same as in the first example and fourth example.

Example 9

Figure 20:
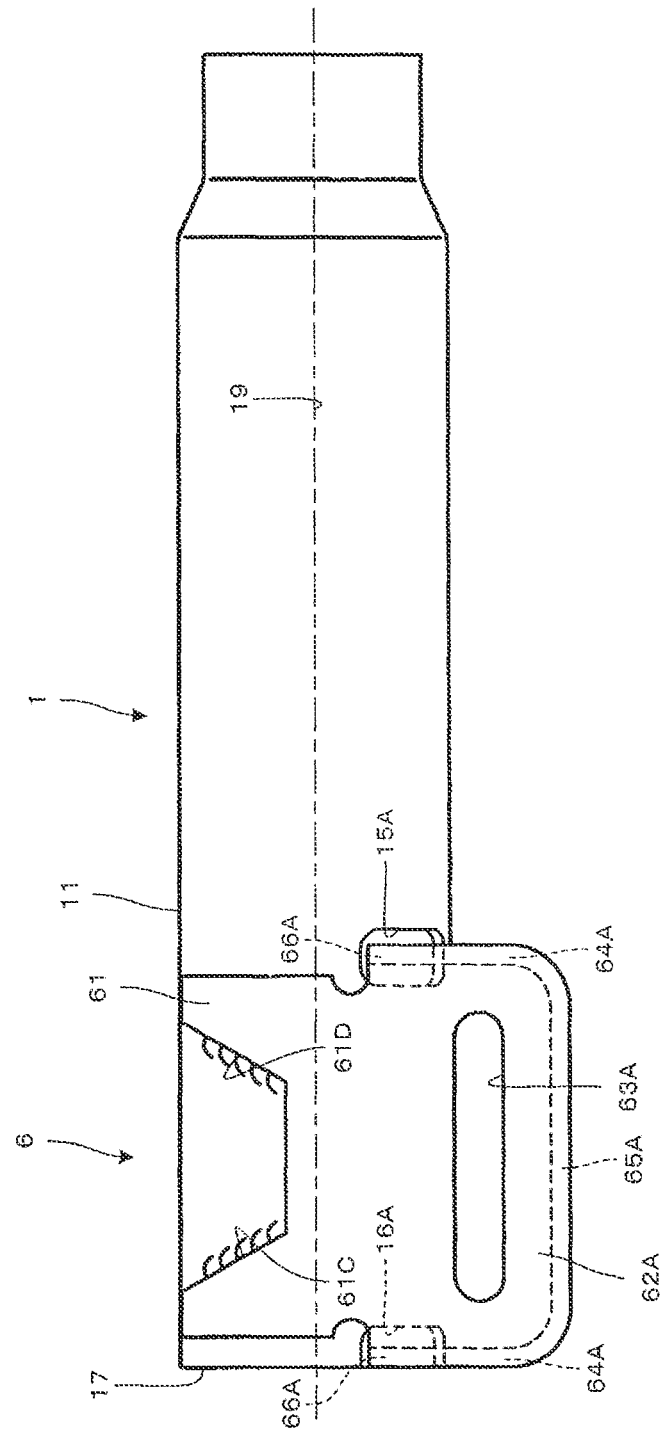
FIG. 20 is a front view illustrating the outer column of a ninth example of an embodiment of the present invention.

FIG. 20 illustrates a steering apparatus of a ninth example of an embodiment of the present invention. In the following explanation, the same reference numbers are used for parts and elements that are the same as in the first, fourth and eighth examples, and any redundant explanations will be omitted, so that only the portions that differ from the first, fourth and eighth examples will be explained.

This example is a variation of the eighth example, and is an example wherein when welding the distance bracket 6 onto the outer column 1, together with forming the weld such that the lengthwise direction of the weld is inclined with respect to the center axis line of the outer column 1, welding is performed near the end surface of the outer column 1. In other words, as illustrated in FIG. 20, the distance bracket 6 of this example has the same shape as in the eighth example. In this example, bent sections 64A, 64B and clamping sections 66A, 66B on the side toward the front vehicle of the distance bracket 6 are arranged so as to come in close to the end surface 17 on the side toward the front of the vehicle of the outer column 1. Moreover, through holes 16A, 16B on the side toward the front of the vehicle of the outer column 1 are formed in a notch shape that open to the end surface 17 on the side toward the front of the vehicle of the outer column 1.

Near the end surface 17 on the side toward the front of the vehicle of the outer column 1, the through holes 16A, 16B are open so the rigidity becomes small. Therefore, when welding the distance bracket 6 near the end surface 17 on the side toward the front of the vehicle of the outer column 1, there is a tendency for warping in the axial direction of the outer column 1 to become large due to thermal deformation after welding. However, in this example, when the distance bracket 6 is welded to the outer column 1, the lengthwise direction of the weld is inclined with respect to the center axis line of the outer column 1. As a result, in this example, warping in the axial direction of the outer column 1 is suppressed, so it is possible to omit a correction process, and thus it is possible to suppress an increase in manufacturing cost. The construction and effect of other parts of the ninth example are the same as in the first, fourth and eighth examples.

Example 10

Figure 21:
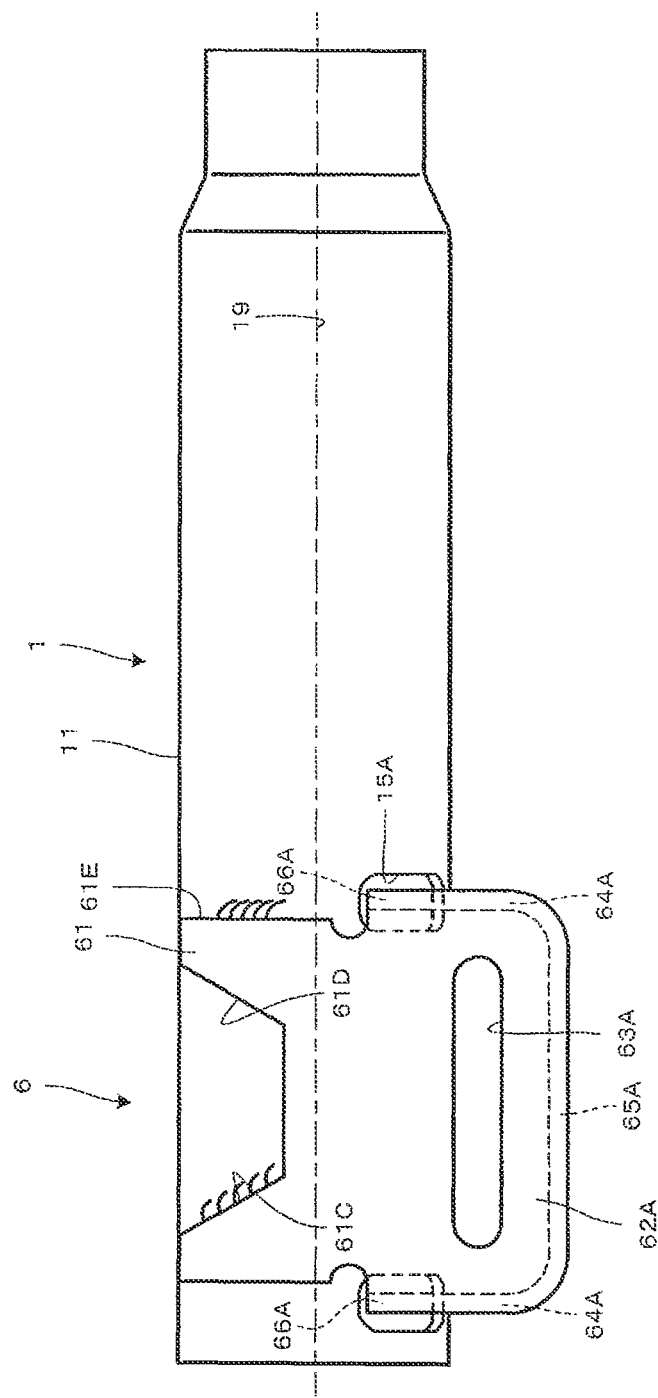
FIG. 21 is a front view illustrating the outer column of a tenth example of an embodiment of the present invention.
Figure 22:
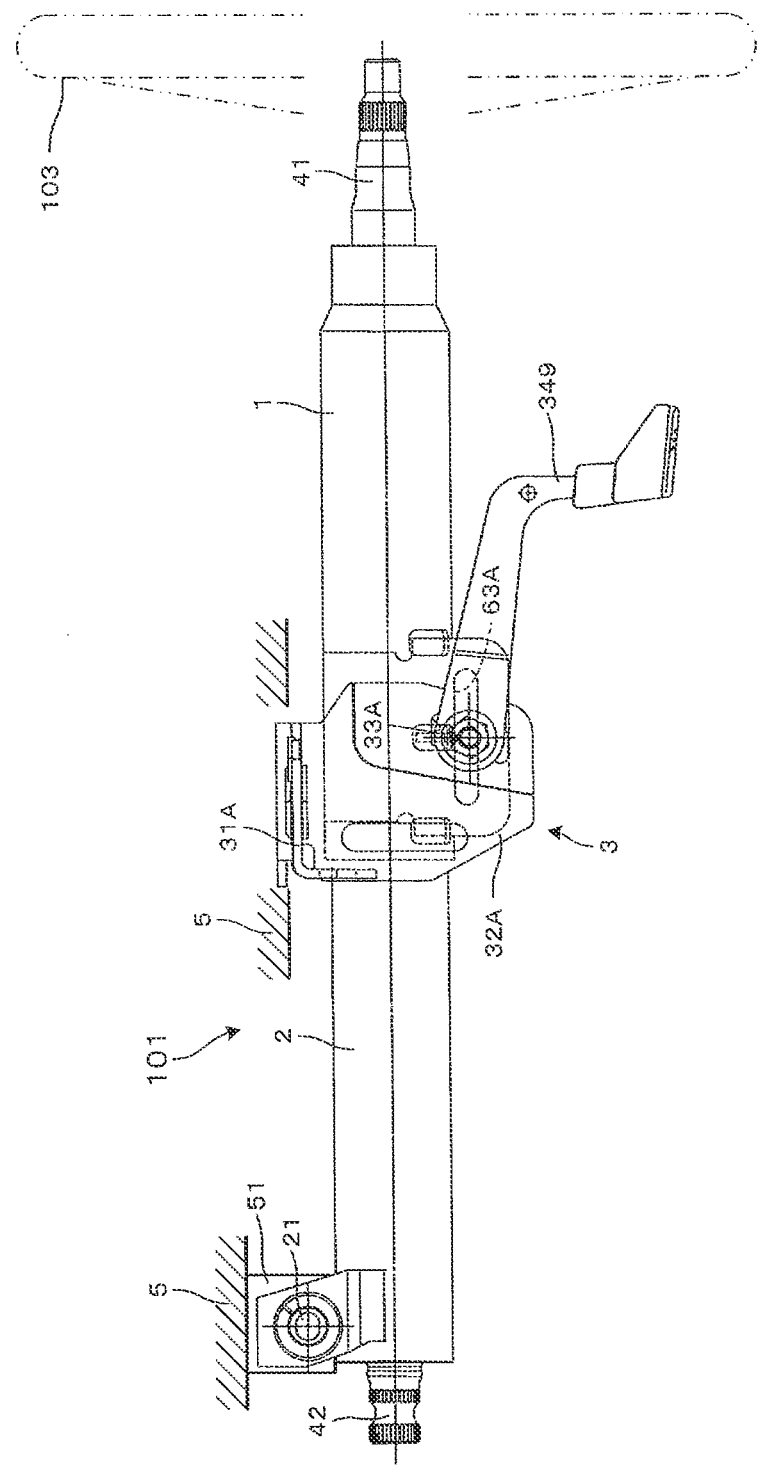
FIG. 22 is a front view illustrating the main parts of a steering apparatus of an eleventh example of an embodiment of the present invention.
Figure 23:
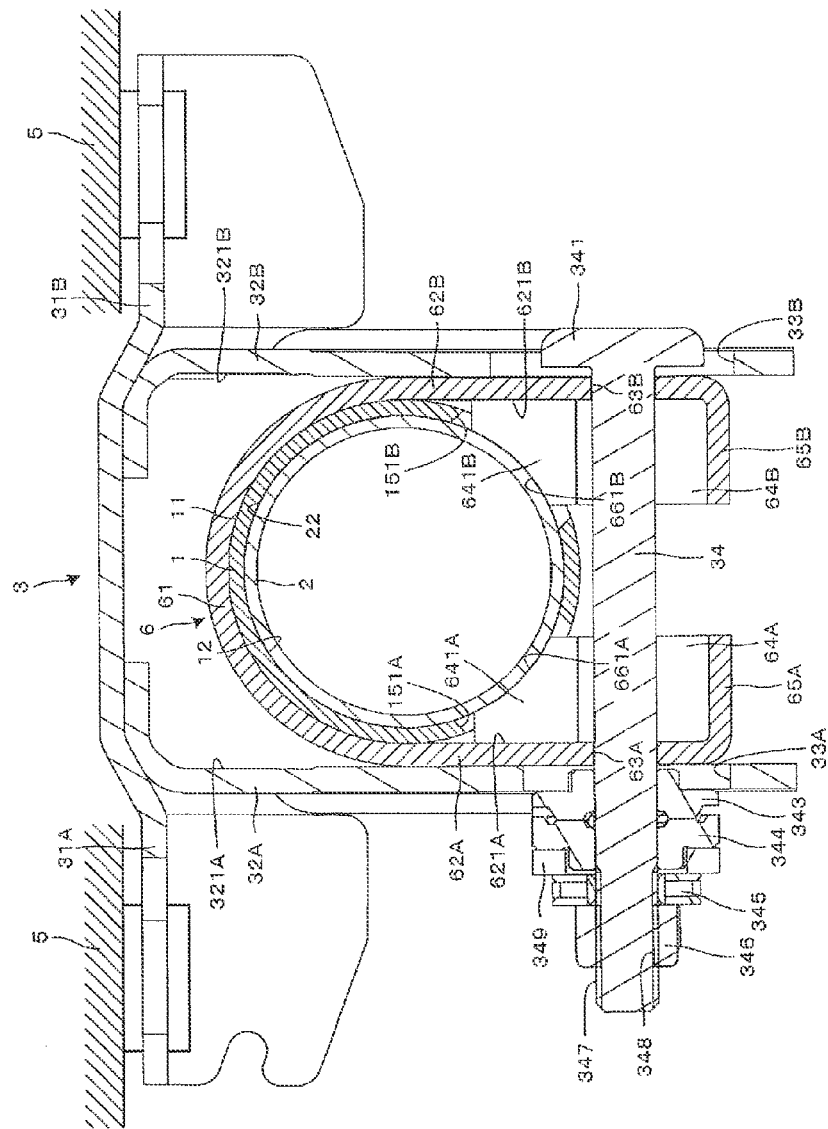
FIG. 23 is a cross-sectional view of the steering apparatus in FIG. 22, and is similar to FIG. 3.
Figure 24:
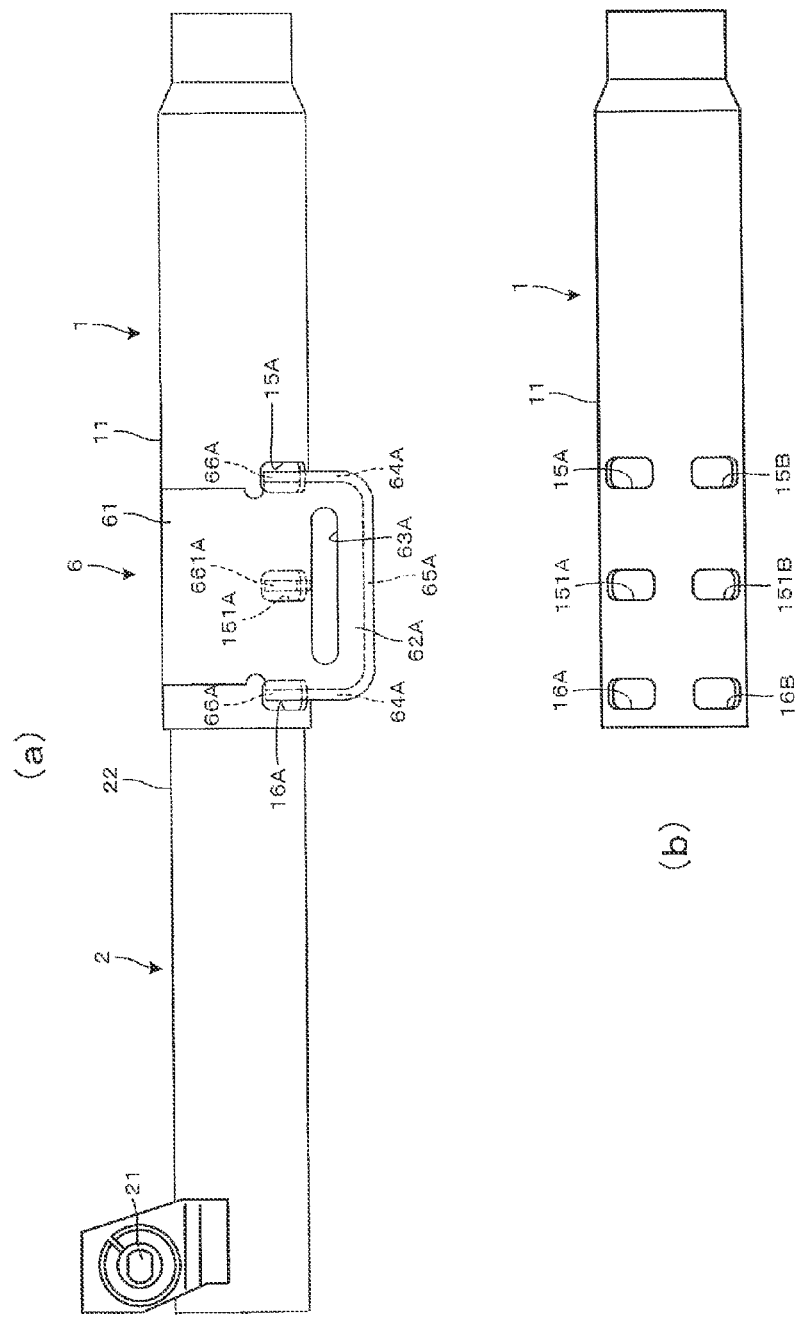
FIG. 24A is a front view illustrating the state of the steering apparatus in FIG. 22 with the vehicle installation bracket, steering shaft, and clamp apparatus omitted.
FIG. 24B is a bottom view of only the outer column in FIG. 24A as seen from the bottom side of the vehicle.
Figure 25:
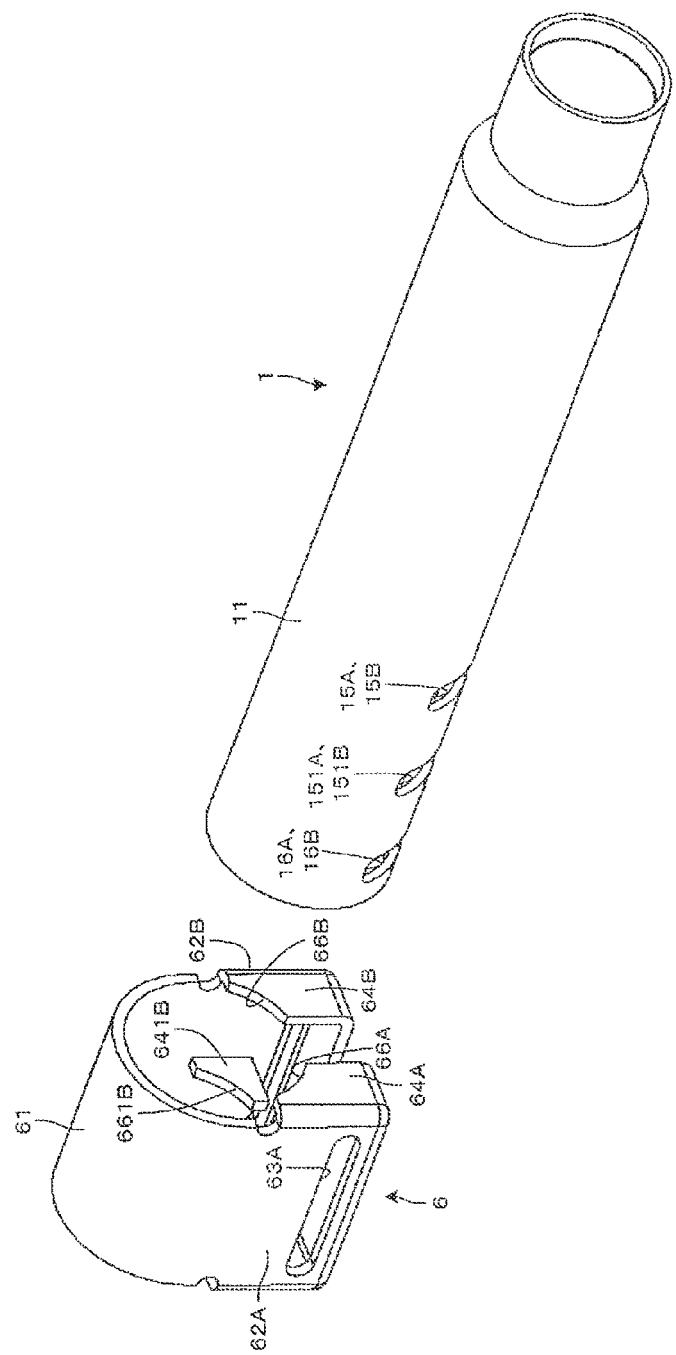
FIG. 25 is an exploded perspective view of the state in FIG. 24A with the inner column omitted, and illustrates the separated state of the outer column and the distance bracket.

FIG. 21 illustrates a steering apparatus of a ninth example of an embodiment of the present invention. In the following explanation, the same reference numbers are used for parts and elements that are the same as in the first, fourth and eighth examples, and any redundant explanations will be omitted, so that only the portions that differ from the first, fourth and eighth examples will be explained.

This example is also a variation of the eighth example, and is an example wherein when welding the distance bracket 6 onto the outer column 1, together with forming the weld such that the lengthwise direction of the weld is inclined with respect to the center axis line of the outer column 1, the lengthwise direction of the part of the weld is orthogonal with respect to the center axis line of the outer column. In other words, as illustrated in FIG. 21, the distance bracket 6 of this example has the same shape as in the eighth example. In this example, the orthogonal edge (the edge that is orthogonal with respect to the center axis line of the outer column 1) 61E on the side toward the rear of the vehicle of the arc shaped section 61 of the distance bracket 6 is further welded and fastened to the outer circumferential surface 11. Therefore, when the distance bracket 6 is welded to the outer column 1, the lengthwise direction of the weld is composed of two directions, a portion that is inclined with respect to the center axis line of the outer column 1 (inclined edges 61C, 61D), and a portion that is orthogonal (orthogonal edge 61E).

In this example, when the distance bracket 6 is welded to the outer column 1, the lengthwise direction of the weld is comprised of two types, inclined portions that are inclined with respect to the center axis line of the outer column 1 and an orthogonal portion, so deformation of the inner circumferential surface 12 of the outer column 1 to an elliptical shape, or warping in the axial direction of the outer column 1 is suppressed, and it is possible to omit a correction process and suppress an increase in manufacturing cost. The construction and effect of other parts of this tenth example are the same as in the first, fourth and eighth examples.

Example 11

FIG. 22 to FIG. 25 illustrate a steering apparatus of an eleventh example of an embodiment of the present invention. In the following explanation, the same reference numbers are used for parts and elements that are the same as in the first and fourth examples, and any redundant explanations are omitted so that only the portions that differ from the first and fourth examples are explained.

This example is an example wherein clamping sections and through holes are formed at three locations; the side toward the rear of the vehicle, the side toward the front of the vehicle and in between the side toward the rear of the vehicle and the side toward the front of the vehicle. In other words, in the distance bracket 6 of this example, together with bent sections 64A, 64B being formed on both ends in the forward-backward direction of the vehicle, protruding sections 641A, 641B that protrude toward the inside in the width direction of the vehicle are welded and fastened to the inside surface of the 621A of the flat surface section 62A and the inside surface 621B of the flat surface section 62B in an intermediate position of the length in the forward-backward direction of the vehicle of the distance bracket 6. Arc shaped clamping sections 661A, 661B are formed in the inside surfaces in the width direction of the vehicle in the protruding sections 641A, 641B. The shape of the clamping sections 661A, 661B is the same as the shape of the clamping sections 66A, 66B of the bent sections 64A, 64B.

A pair of left and right through holes 15A, 15B through which the clamping sections 66A, 66B on the side toward the rear of the vehicle are inserted, and a pair of left and right through holes 16A, 16B through which the clamping sections 66A, 66B on the side toward the front of the vehicle are inserted are formed in the outer column 1. Moreover, a pair of left and right through holes 151A, 151B are formed at an intermediate position along the length in the forward-backward direction of the vehicle between the through holes 15A, 15B and the through holes 16A, 16B, and the clamping sections 661A, 661B in the intermediate position are inserted through the through holes 151A, 151B in the intermediate position. The through holes 15A, 15B, 151A, 151B, 16A, 16B are formed so as to be short in the axial direction of the outer column 1, with the dimensions being a little larger than the thickness in the forward-backward direction of the vehicle of the clamping sections 66A, 66B and clamping sections 661A, 661B.

The clamping sections 66A, 66B and the clamping sections 661A, 661B are inserted through the through holes 15A, 15B, 151A, 151B, 16A, 16B, and the clamping sections 66A, 66B and the clamping sections 661A, 661B directly clamp the outer circumferential surface of the inner column 2. In this example, in addition to the effect of the fourth example, the outer circumferential surface 22 of the inner column 2 is directly clamped at six locations by the clamping sections, so the rigidity of the clamped section is increased, and the clamping force can be increased, and thus it is possible to improve the operational feeling of the steering apparatus. The construction and effect of the other parts of this eleventh example are the same as in the first and fourth examples.

Example 12

Figure 26:
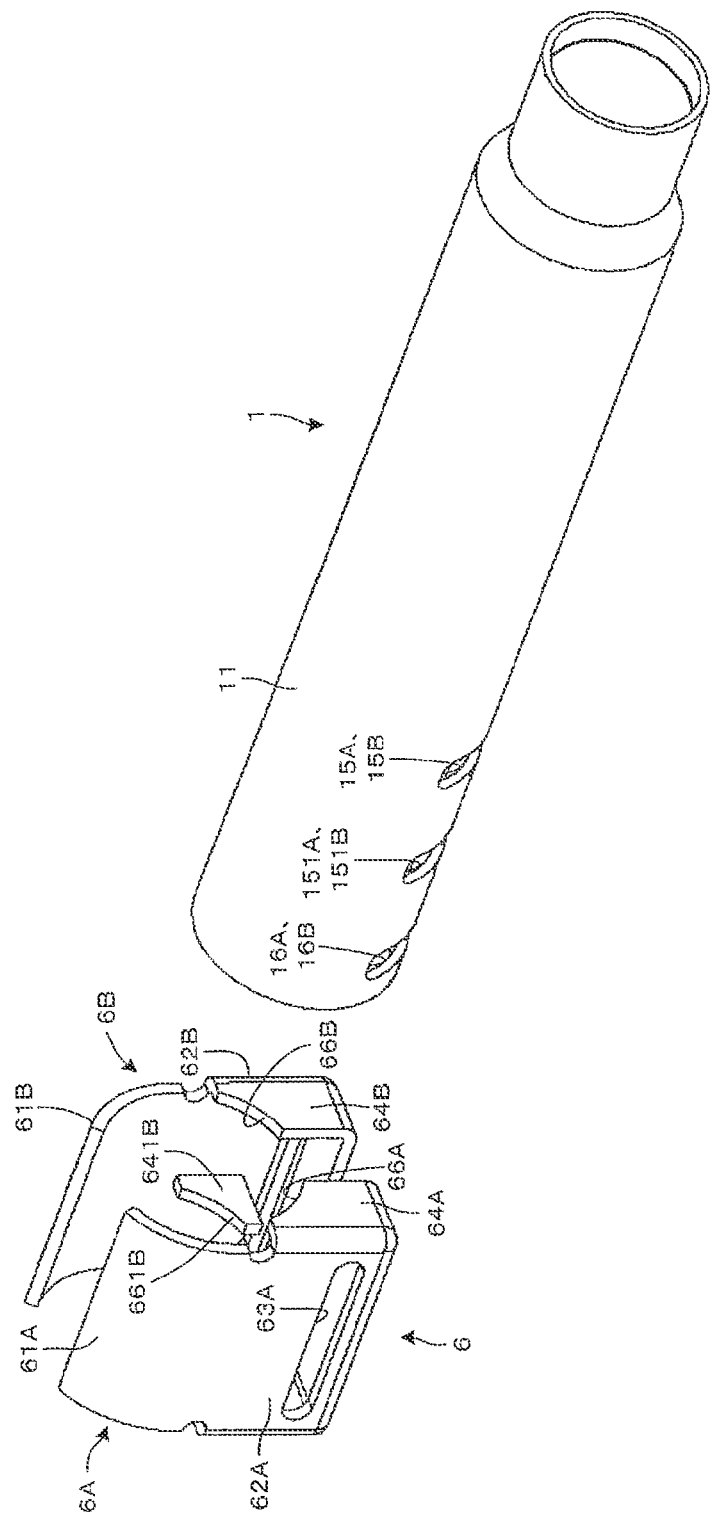
FIG. 26 is an exploded perspective view of an outer column and distance bracket of a steering apparatus of a twelfth example of an embodiment of the present invention.

FIG. 26 illustrates a steering apparatus of a twelfth example of an embodiment of the present invention. In the following explanation, the same reference numbers are used for parts and elements that are the same as in the first, second and eleventh example, and any redundant explanations are omitted so that only the portions that differ from the first, second and eleventh example are explained.

This twelfth example is an example wherein together with forming the left and right clamping sections of the distance bracket 6 as separate parts as in the second example, clamping sections and through holes, as in the eleventh example, are formed at three locations, the side toward the front of the vehicle, the side toward the rear of the vehicle, and an intermediate position between the side toward the front of the vehicle and the side toward the rear of the vehicle. In other words, as illustrated in FIG. 26, the distance bracket 6 of this example is composed of a left distance bracket 6A and a right distance bracket 6B, and bent sections 64A, 64B that are formed on both ends in the forward-backward direction of the vehicle, and protruding sections 641A, 641B that are fastened by welding to an intermediate position along the length in the forward-backward direction of the vehicle are formed in the left distance bracket 64A and right distance bracket 64B. Arc shaped clamping sections 66A, 66B, 661A, 661B are respectively formed on the inside surfaces in the width direction of these bend sections 64A, 64B and protruding sections 641A, 641B. In this example a combined effect of the effect of the second example and the effect of the eleventh example is obtained. The construction and effect of the other parts of this twelfth example are the same as in the first, second and eleventh examples.

Example 13

Figure 27:
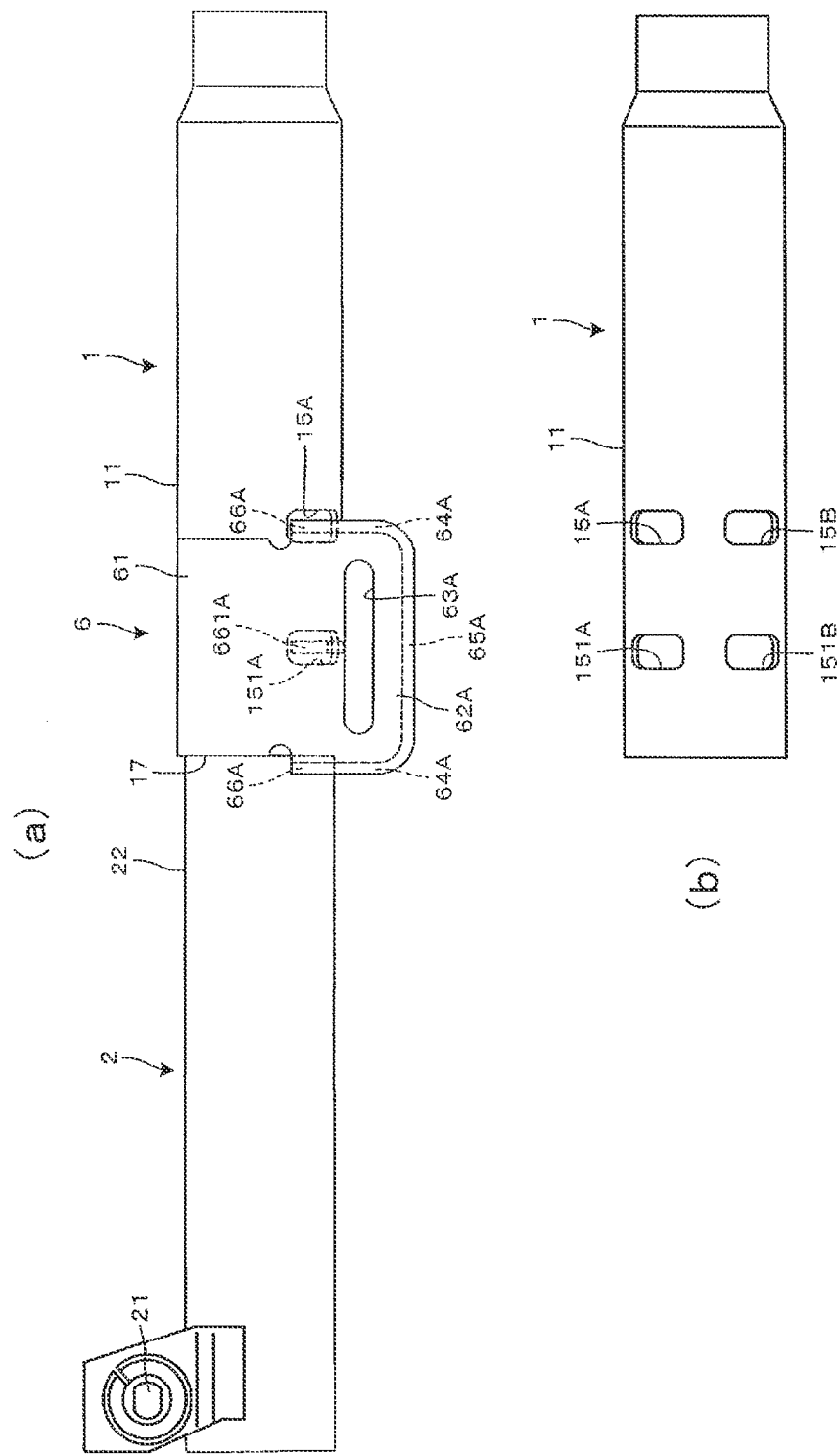
FIG. 27A is a is a front view of a steering apparatus of a thirteenth example of an embodiment of the present invention with the vehicle installation bracket, steering shaft, and clamp apparatus omitted.
FIG. 27B is a bottom view of only the outer column in FIG. 27A as seen from the bottom side of the vehicle.
Figure 28:
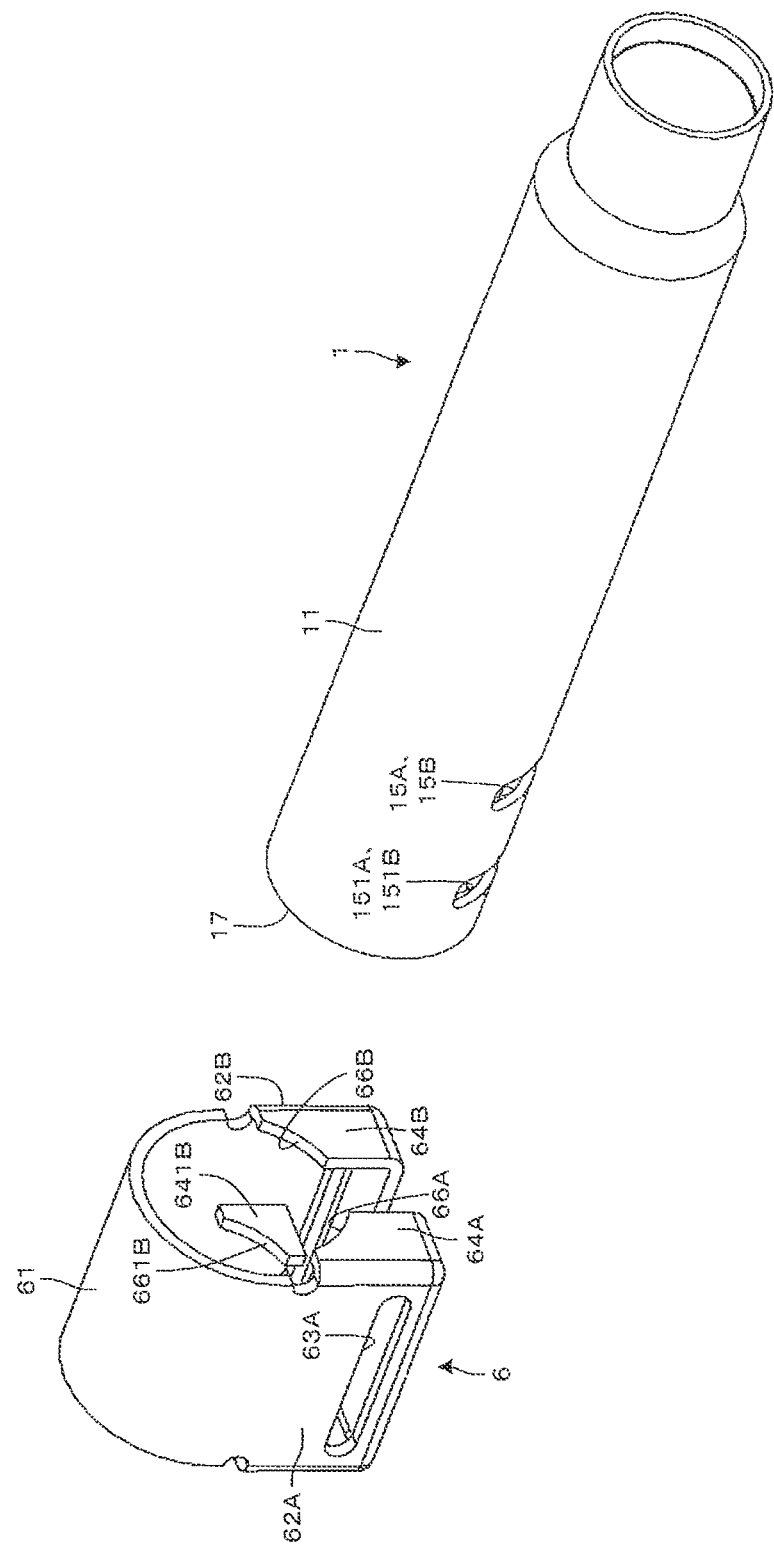
FIG. 28 is an exploded perspective view of the state in FIG. 27A with the inner column omitted, and illustrates the separated state of the outer column and distance bracket.

FIG. 27A to FIG. 28 illustrate a steering apparatus of a thirteenth example of an embodiment of the present invention. In the following explanation, the same reference numbers are used for parts and elements that are the same as in the first, fifth and eleventh examples, and any redundant explanations are omitted so that only the portions that differ from the first, fifth and eleventh examples are explained.

This example is an example wherein, as in the eleventh example, clamping sections are formed at three locations, the side toward the front of the vehicle, the side toward the rear of the vehicle and an intermediate position between the side toward the front of the vehicle and the side toward the rear of the vehicle, and as in fifth example, through holes on the side toward the front of the vehicle are omitted, so that through holes are formed at only two locations, on the side toward the rear of the vehicle and an intermediate position between the through holes on the side toward the rear of the vehicle and the end surface. In other words, in this example, only the pairs of left and right through holes 15A, 15B, 151A, 151B through which the clamping sections 66A, 66B on the side toward the rear of the vehicle, and the clamping sections 661A, 661B in the intermediate position are inserted are formed in the outer column 1. On the other hand, the clamping sections 66A, 66B on the side toward the front of the vehicle are located further on the side toward the front of the vehicle than the end surface 17 of the outer column 1 on the side toward the front of the vehicle.

The clamping sections 66A, 66B on the side toward the rear of the vehicle, and the clamping sections 661A, 661B in the intermediate position are inserted through the through holes 15A, 15B, 151A, 151B and directly clamp the outer circumferential surface 22 of the inner column 2. Moreover, the clamping sections 66A, 66B on the side toward the front of the vehicle directly clamp the outer circumferential surface 22 of the inner column 2 without being inserted through any through holes. In this example, a combined effect of the effect of the fifth example and the effect of the first example is obtained. The construction and effect of the other parts of this thirteenth example are the same as in the first, fifth and eleventh examples.

Example 14

Figure 29:
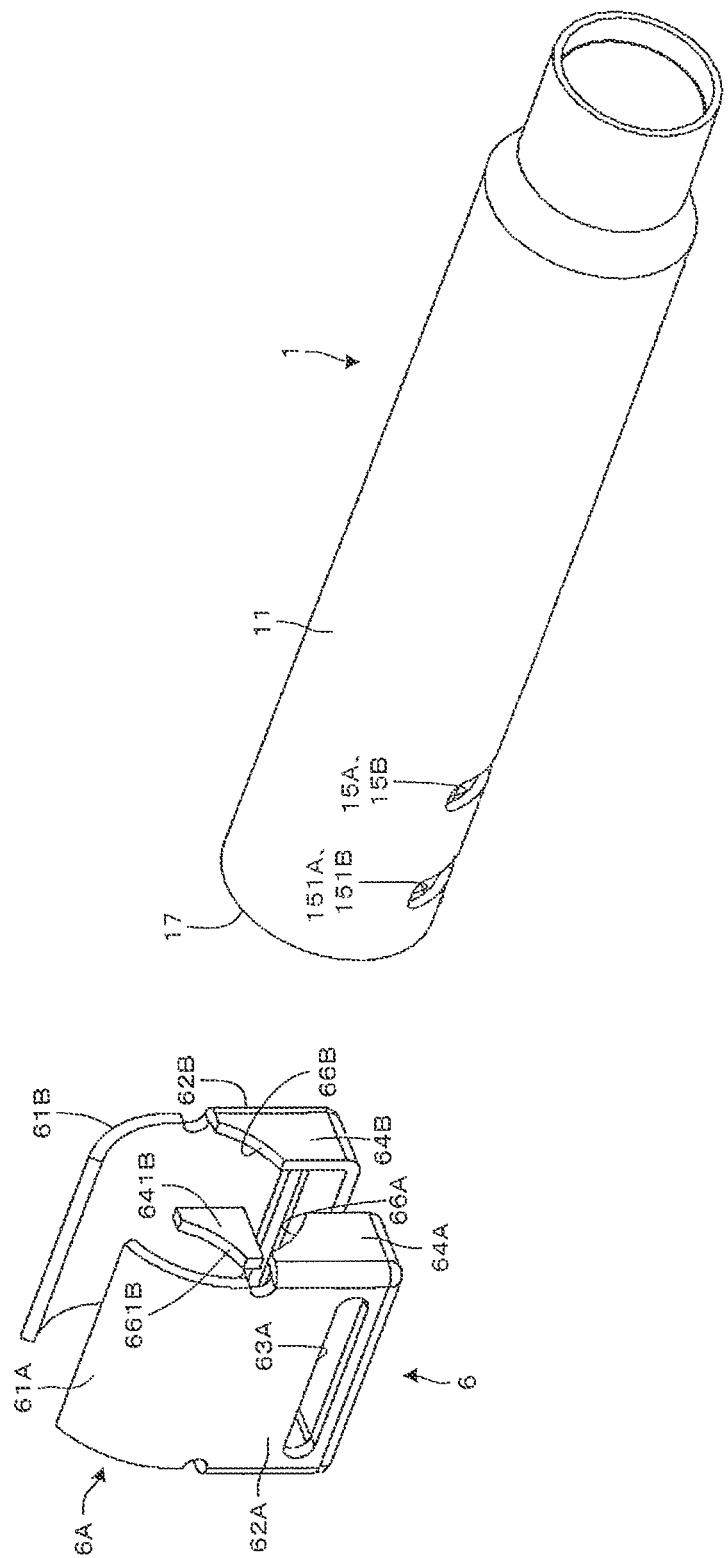
FIG. 29 is an exploded perspective view of the outer column and distance bracket of a steering apparatus of a fourteenth example of an embodiment of the present invention.

FIG. 29 illustrates a steering apparatus of a fourteenth example of an embodiment of the present invention. In the following explanation, the same reference numbers are used for parts and elements that are the same as in the first, second and thirteenth examples, and any redundant explanations are omitted so that only portions that differ from the first, second and thirteenth examples are explained.

In this example, the distance bracket 6, differing from the thirteenth example, but similar to the second example, is composed of two separate parts 6A, 6B, and similar to the thirteenth example, the clamping sections 66A, 66B, 661A, 661B are formed at three locations, the side toward the front of the vehicle, the side toward the rear of the vehicle, and an intermediate position between the side toward the front of the vehicle and the side toward the rear of the vehicle, and through holes 15A, 15B, 151A, 151B are formed at two locations, the side toward the rear of the vehicle, and the intermediate position. In this example, a combined effect of the effect of the second example and the effect of the thirteenth example is obtained. The construction and effect of the other parts of this fourteenth example are the same as in the first, second and thirteenth examples.

Example 15

Figure 30:
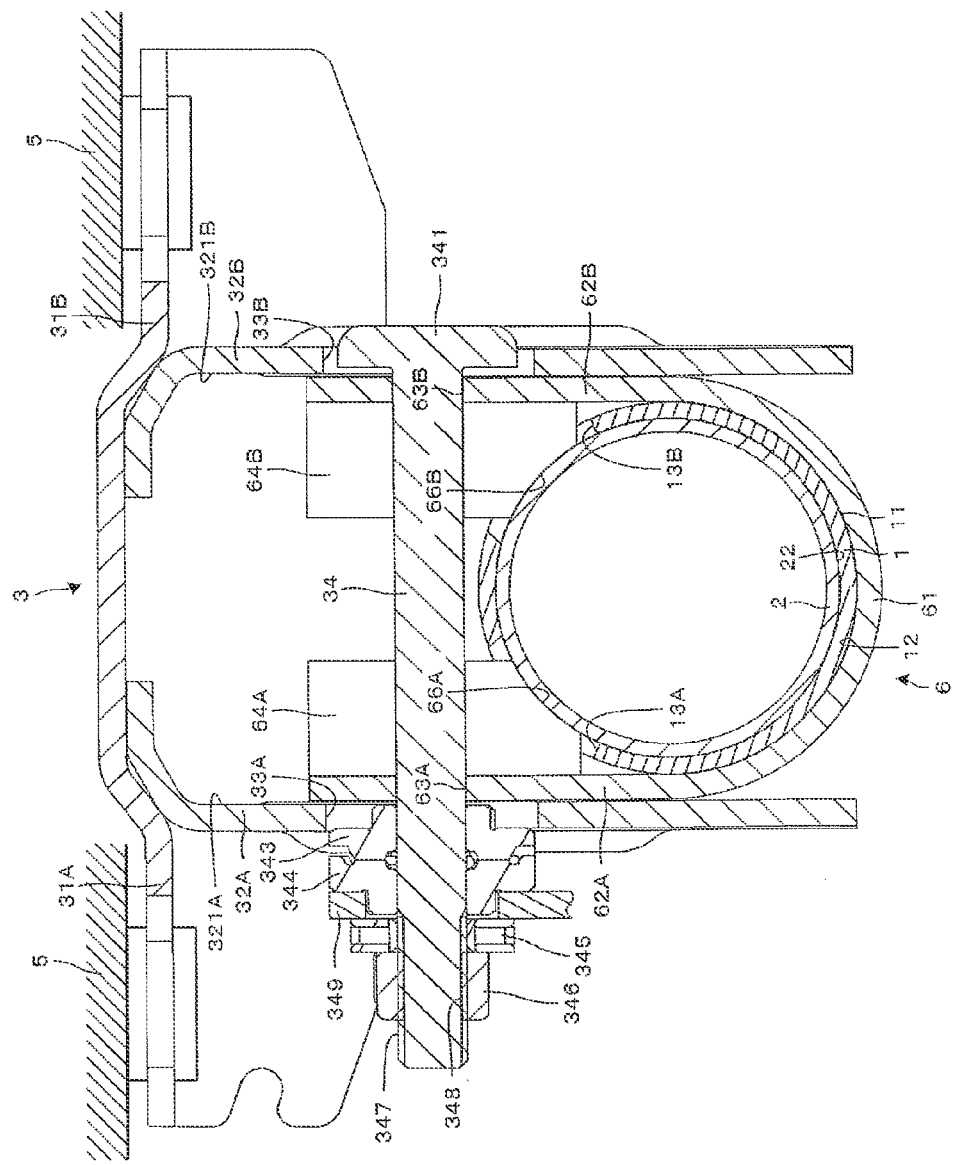
FIG. 30 is a cross-sectional view of a steering apparatus of a fifteenth example of an embodiment of the present invention, and is similar to FIG. 3.
Figure 31:
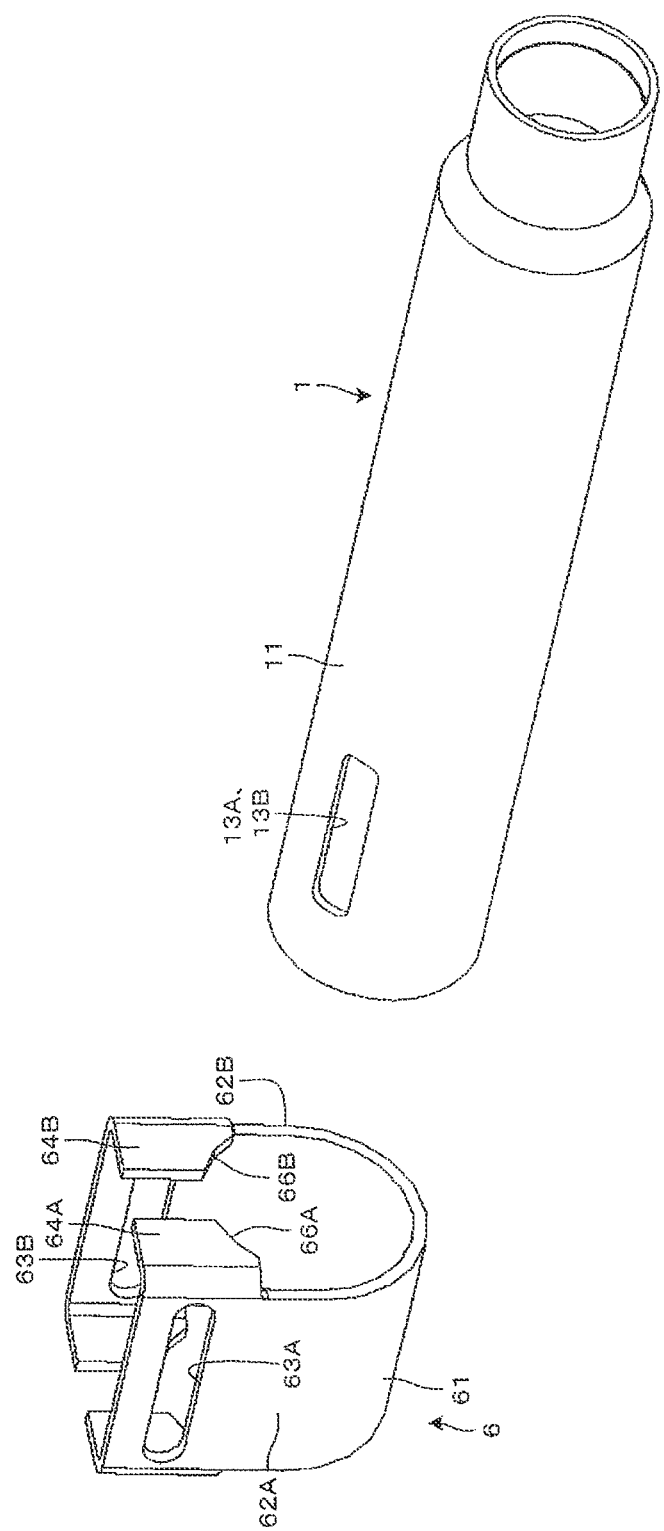
FIG. 31 is an exploded perspective view of the outer column and distance bracket of the steering apparatus illustrated in FIG. 30.

FIG. 30 and FIG. 31 illustrate a steering apparatus of a fifteenth example of an embodiment of the present invention. In the following explanation, the same reference numbers are used for parts and elements that are the same as in the first example, and any redundant explanations are omitted so that only the portions that differ from the first example are explained.

This example is an example wherein the clamping rod 34 and the clamping section of the distance bracket are arranged on the outer column on the side toward the top of the vehicle. In other words, the distance bracket 6 has a symmetrical shape with respect to a vertical plate that passes through the center axis line of the outer column 1, and is integrally formed by bending rectangular steel plate into a U shape. The distance bracket 6 is fitted around the outer circumferential surface 11 of the outer column 1, and is fastened to the outer circumferential surface on the side toward the bottom of the vehicle by welding.

Flat surface sections 62A, 62B that are parallel with the side plates 32A, 32B and that extend upward are formed on both ends of the upper portion of the arc shaped section 61. The flat surface sections 62A, 62B are held between the inside surfaces 321A, 321B of the right and left side plates 32A, 32B so as to be able to move in the forward-backward direction and up-down direction. Long grooves 63A, 63B in the forward-backward direction that are long in the axial direction (direction orthogonal to the paper surface in FIG. 30) are formed in the flat surface sections 62A, 62B. A circular rod shaped clamping rod 34 that is inserted though long grooves 33A, 33B in the up-down direction that are formed in the side plates 32A, 32B and the long grooves 63A, 63B in the forward-backward direction is inserted from the right side in FIG. 30, and this clamping rod 34 is located on the outer column 1 on the side toward the top of the vehicle.

Bent sections 64A, 64B are formed on the flat surface sections 62A, 62B of the distance bracket 6, on both ends in the forward-backward direction of the vehicle of the flat surface sections 62A, 62B. The bent sections 64A, 64B are bent at right angles toward the inside in the width direction of the vehicle from the flat surface sections 62A, 62B. A pair of left and right arc shaped clamping sections 66A, 66B are formed on the inside surfaces of the bent sections 64A, 64B in the width direction of the vehicle. A pair of left and right through holes 13A, 13B through which the clamping sections 66A, 66B are inserted is formed on the outer column 1 on the side toward the top of the vehicle. The through holes are formed so as to be long in the axial direction of the outer column 1. The clamping sections 66A, 66B are inserted through the through holes 13A, 13B, and these clamping sections directly clamp the outer circumferential surface 22 of the inner column 2 on the side toward the top of the vehicle. The construction and effect of the other parts of this fifteenth example are the same as in the first example.

Example 16

Figure 32:
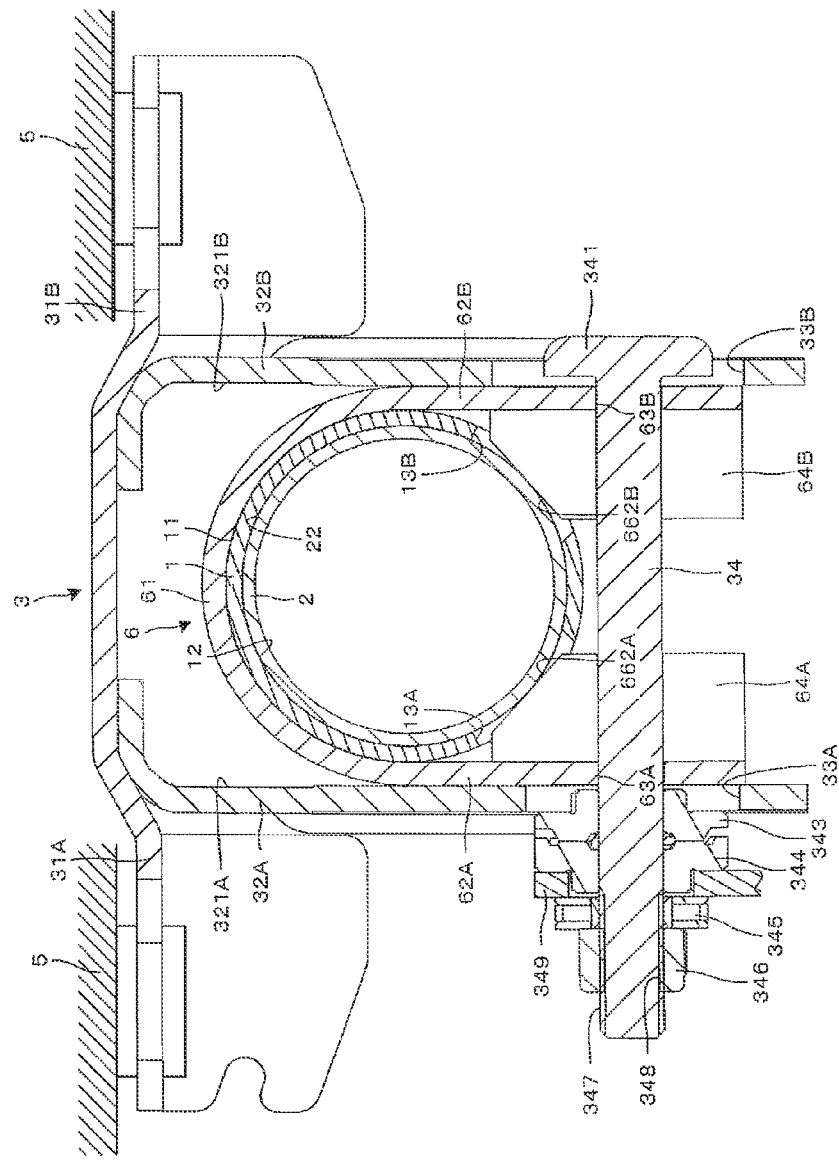
FIG. 32 is a cross-sectional view of a steering apparatus of a sixteenth example of an embodiment of the present invention, and is similar to FIG. 3.

FIG. 32 illustrates a steering apparatus of a sixteenth example of an embodiment of the present invention. In the following explanation, the same reference numbers are used for the same parts and elements as in the first example, and any redundant explanations are omitted so that only the portions that differ from the first example are explained.

This example is an example wherein the clamping sections of the distance bracket 6 are formed in a straight shape. In other words, as illustrated in FIG. 32, a pair of left and right straight clamping sections 662A, 662B are formed on the inside surfaces in the width direction of the vehicle of the bent sections 64A, 64B of the distance bracket 6. The clamping sections 662A, 662B are inserted through the through holes 13A, 13B, and these clamping sections 662A, 662B directly clamp the outer circumferential surface 22 of the inner column 2. Flat surface sections may be formed on the outer circumferential surface 22 of the inner column so as to face the clamping sections 662A, 662B, and when the clamping sections 662A, 662B have clamped the outer circumferential surface 22 of the inner column 2, these flat surfaces can come in contact with each other.

In this example, the clamping sections 662A, 662B of the distance bracket 6 are formed in a straight shape, so processing the clamping sections 662A, 662B is easy, and thus it is possible to reduce the manufacturing cost. Moreover, the clamping force acts perpendicular to the straight section of the clamping sections 662A, 662B, so the clamping force that acts on the clamping rod 34 in the axial direction thereof can be transmitted efficiently to the clamping sections. The construction and effect of the other parts of this sixteenth example are the same as in the first example.

Example 17

Figure 33:
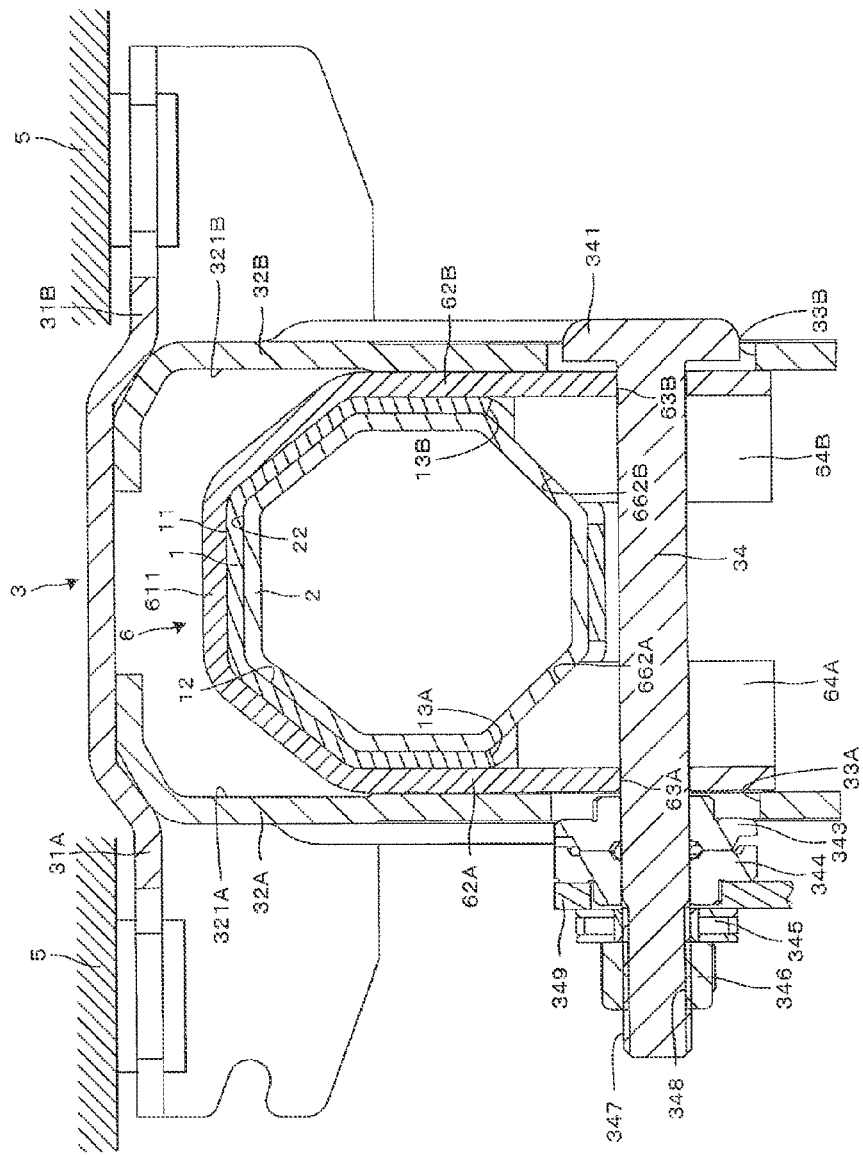
FIG. 33 is a cross-sectional view of a steering apparatus of a seventeenth example of an embodiment of the present invention, and is similar to FIG. 3.

FIG. 33 illustrates a steering apparatus of a seventeenth example of an embodiment of the present invention. In the following explanation, the same reference numbers are used for parts and elements that are the same as in the first example, and any redundant explanations are omitted so that only portions that differ from the first example are explained.

This example is an example wherein together with the clamping sections of the distance bracket 6 being formed in a straight shape, the cross-sectional shape of the outer column and inner column is a hollow polygonal shape. In other words, as illustrated in FIG. 33, a hollow polygonal (hollow octagonal) shaped inner column 2 is fitted inside a hollow polygonal (hollow octagonal) shaped outer column 1 on the side of the outer column 1 toward the front of the vehicle (back side that is orthogonal to the paper surface in FIG. 33) so as to be able to slide in the axial direction. The cross-sectional shape of the outer column 1 and inner column 2 is not limited to being an octagonal shape, but could also be any arbitrary polygonal shape such as a square shape or a hexagonal shape.

The distance bracket 6 is formed by bending the side toward the bottom of the vehicle into a trapezoidal shape along the outer circumferential surface 11 of the outer column 1. The distance bracket 6 is such that the trapezoidal section 611 on the top fits around the outer circumferential surface 11 of the outer column 1, and is fastened to the outer circumferential surface 11 by welding. A pair of left and right straight clamping sections 662A, 662B is formed on the inside surfaces in the width direction of the vehicle of the bent sections 64A, 64B of the distance bracket 6. The clamping sections 662A, 662B are inserted through the through holes 13A, 13B and directly clamp one edge on the left and right outer circumferential surface 22 of the inner column 2 on the side toward the bottom of the vehicle. In this example, the inclination angle of the clamping sections 662A, 662B with respect to the clamping rod 34 is 45 degrees, and perpendicular lines that are perpendicular to the clamping sections 662A, 662B pass through the center of the inner column 2.

In this example, the straight clamping sections 662A, 662B of the distance bracket 6 come in surface contact with straight sides of the outer circumferential surface 22 of the inner column 2, so the holding force during clamping is improved. Moreover, the clamping sections 662A, 662B are formed into a straight shape, so processing the clamping sections 662A, 662B is easy, and thus it is possible to reduce the manufacturing cost. The construction and effect of other parts of this seventeenth example are the same as in the first example.

Example 18

Figure 34:
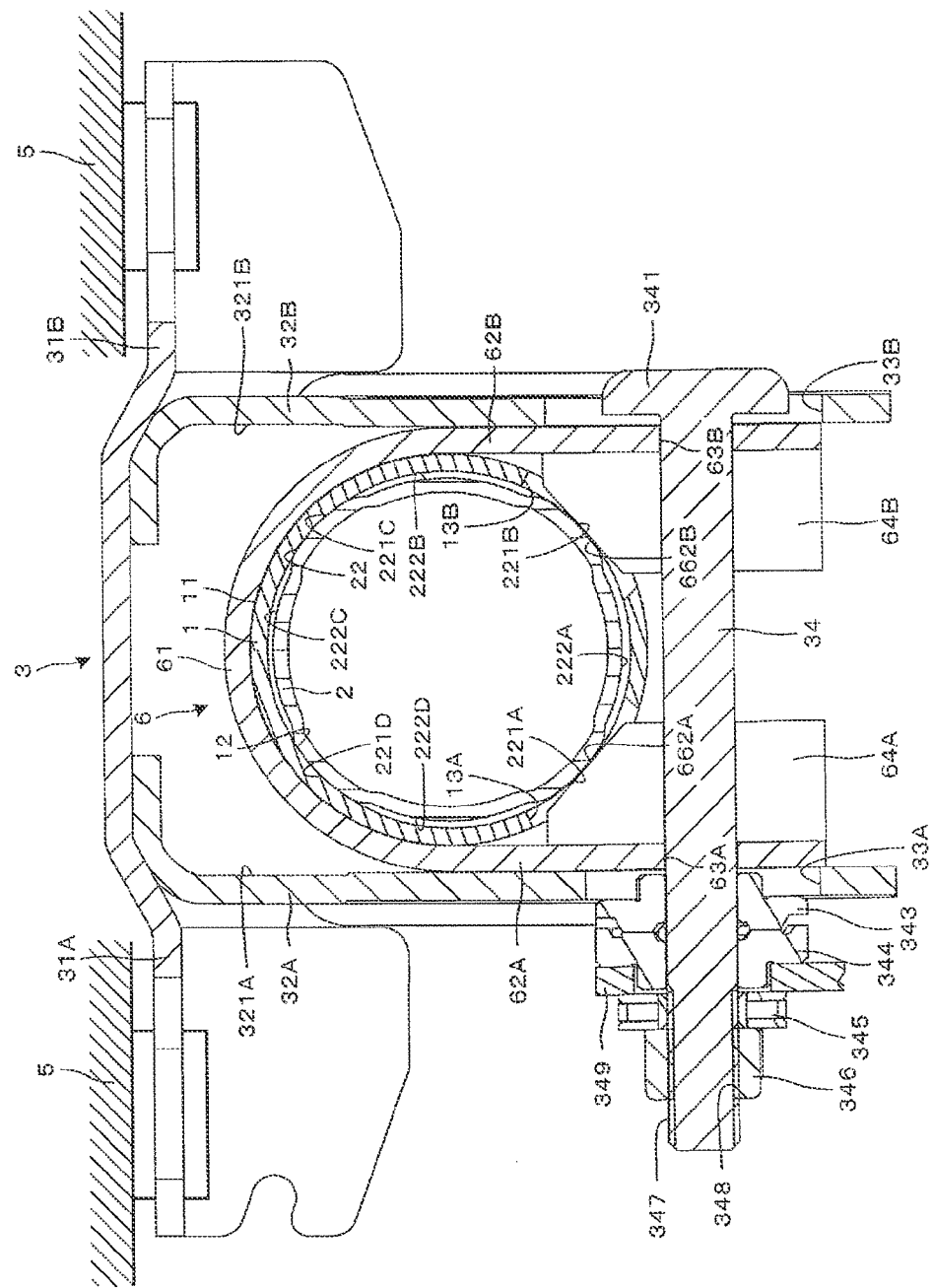
FIG. 34 is a cross-sectional view of a steering apparatus of an eighteenth example of an embodiment of the present invention, and is similar to FIG. 3.

FIG. 34 illustrates a steering apparatus of an eighteenth example of an embodiment of the present invention. In the following explanation, the same reference numbers are used for parts and elements that are the same as in the first example, and any redundant explanations are omitted so that only the portions that differ from the first example are explained.

This example is an example wherein, together with forming the clamping sections of the distance bracket 6 into a straight shape, the convex sections are formed on the outer circumferential surface of the inner column for coming in contact with the clamping sections of the distance bracket 6. In other words, as illustrated in FIG. 34, a pair of straight left and right clamping sections 662A, 662B are formed on the inside surfaces in the width direction of the vehicle of the bent sections 64A, 64B of the distance bracket 6. On the other hand, a pair of left and right through holes 13A, 13B that are long in the axial direction and through which the clamping sections 662A, 662B are inserted are formed in a cylindrical shaped outer column 1. The clamping sections 662A, 662B are inserted through the through holes 13A, 13B, and these clamping sections 662A, 662B directly clamp the outer circumferential surface 22 of the inner column 2.

On the other hand, convex sections 221A, 221B, 221C, 221D that protrude toward the outside in the radial direction, concave sections 222A, 222B, 222C, 222D that are depressed toward the inside in the radial direction are formed at 90-degree intervals around the circumference, and the convex sections 221A to 221D are fitted inside the inner circumferential surface 12 of the outer column 1 so as to be able to slide in the axial direction. The concave sections 222A to 222D face the inner circumferential surface 12 of the outer column 1 through a space. The width of the convex sections 221A to 221D is a little narrower than the width of the through holes 13A, 13B. Moreover, the length in the axial direction of the convex sections 221A to 221D (length in the direction orthogonal to the paper surface in FIG. 34) is longer than the length in the axial direction of the through holes 13A, 13B by the length amount that the outer column 1 is able to move in the forward-backward direction. Therefore, the clamping sections 662A, 662B are able to directly clamp the convex sections 221A, 221B of the inner column 2 on the side toward the bottom of the vehicle.

In this example, contact between the clamping sections 662A, 662B of the distance bracket 6 and the outer circumferential surface of the inner column 2 is maintained, so the clamping force by which the distance bracket 6 clamps the inner column 2 is stable. In this example, four convex sections 221A to 221D are formed at 90-degree intervals around the outer circumference 22 of the inner column 2. In another example, two of the convex sections 221C, 221D on the outer circumference on the upper diagonal side of the vehicle can be eliminated, and alternatively one convex section can be formed on the outer circumference on the side directly toward the top of the vehicle such that the outer circumferential surface 22 of the inner column 2 has a total of three convex sections and three concave sections. The construction and effect of other parts of this eighteenth example are the same as in the first example.

Example 19

Figure 35:
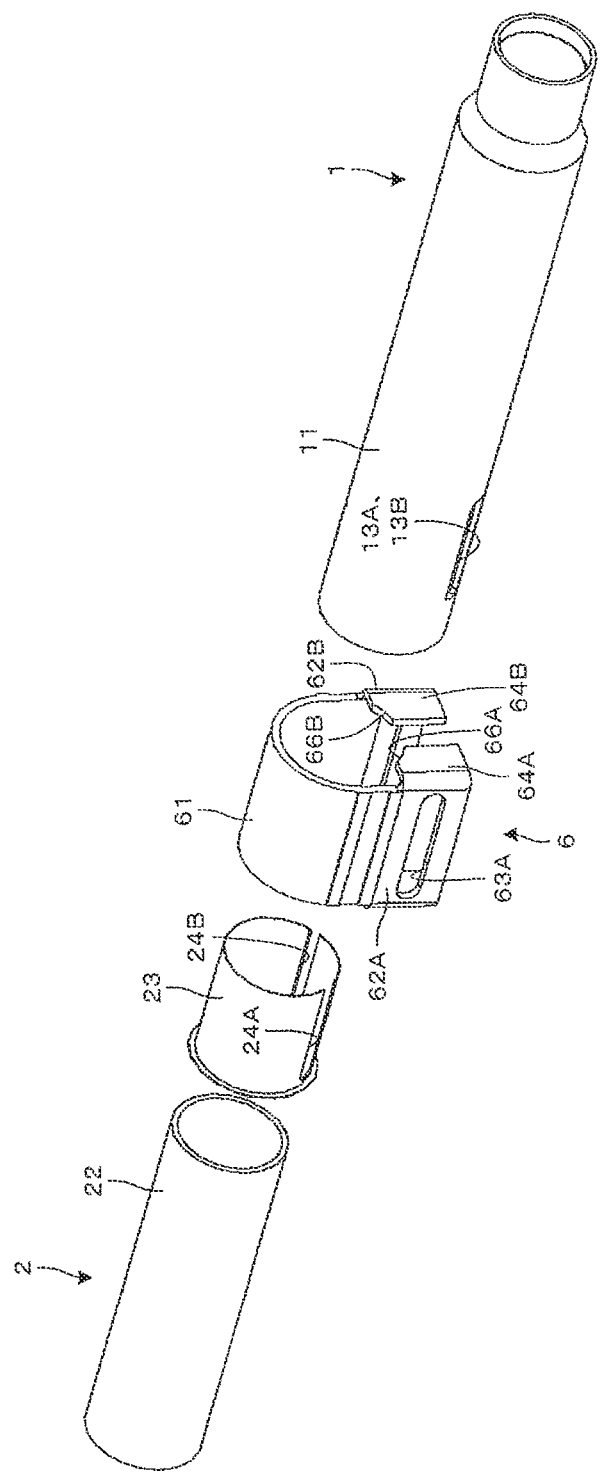
FIG. 35 is an exploded perspective view of the outer column, distance bracket, bushing and inner column of a steering apparatus of a nineteenth example of an embodiment of the present invention.

FIG. 35 illustrates a steering apparatus of a nineteenth example of an embodiment of the present invention. In the following explanation, the same reference numbers are used for parts and elements that are the same as in the first example, and any redundant explanations are omitted so that only the portions that differ from the first example are explained.

This example is an example wherein a bushing 23 having a small friction coefficient is placed between the inner circumferential surface 12 of the outer column 1 and the outer circumferential surface 22 of the inner column 2. As illustrated in FIG. 35, a cylindrical shaped bushing 23 fits around the inside circumferential surface 12 of a hollow cylindrical shaped outer column 1, and the inner column 2 fit around the inner circumferential surface of the bushing 23 so as to be able to slide in the axial direction. The bushing 23 made of synthetic resin having a small friction coefficient. In this example, a bushing 23 having a small friction coefficient is located between the inner circumferential 12 surface of the outer column 1 and the outer circumferential surface 22 of the inner column 2, so the outer column 1 can slide under a small force with respect to the inner column 2. The construction and effects of the other parts of this nineteenth example are the same as in the first example.

Example 20

Figure 36:
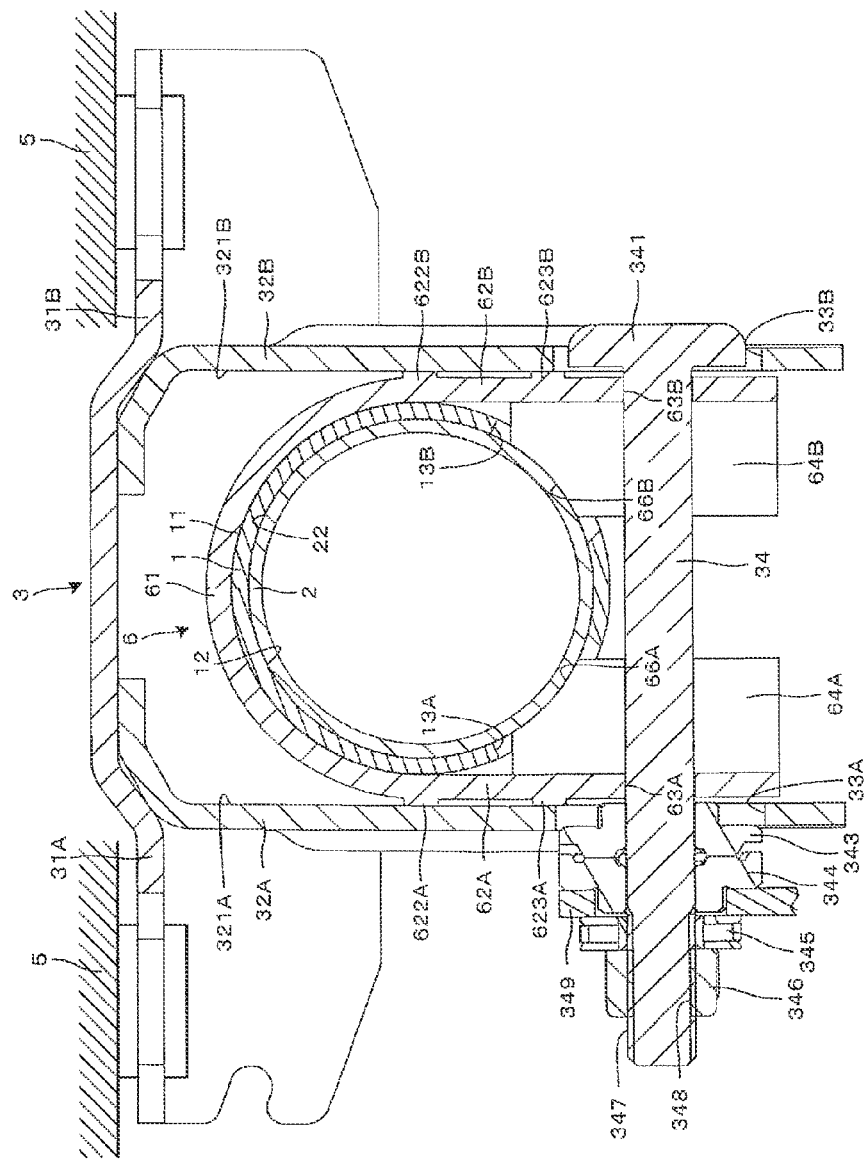
FIG. 36 is a cross-sectional view of a steering apparatus of a twentieth example of an embodiment of the present invention, and is similar to FIG. 3.
Figure 37:
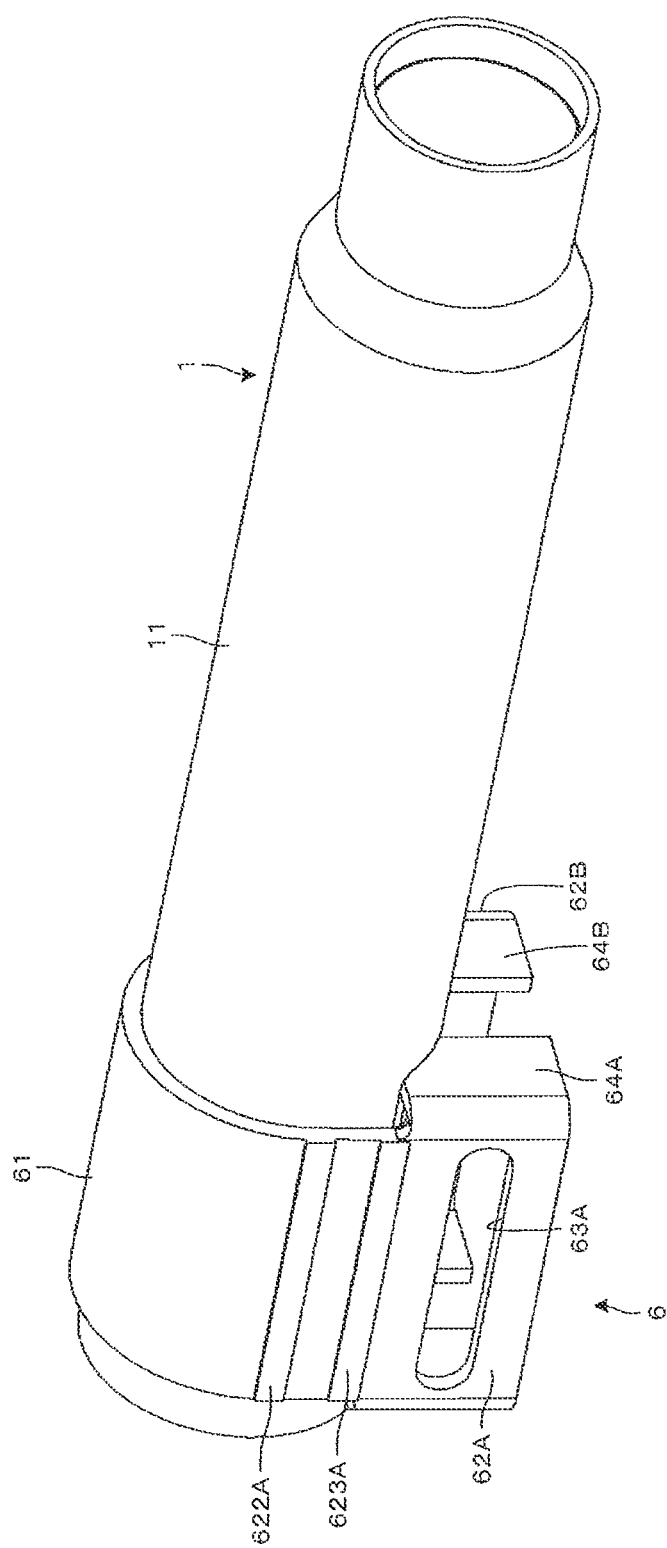
FIG. 37 is a perspective view of the steering apparatus in FIG. 36, and illustrates the state with the vehicle installation bracket, steering shaft and clamp apparatus omitted.

FIG. 36 and FIG. 37 illustrate a steering apparatus of a twentieth example of an embodiment of the present invention. In the following explanation, the same reference numbers are used for parts and elements that are the same as in the first example, and any redundant explanations are omitted so that only the portions that differ from the first example are explained.

This example is an example wherein convex surfaces 622A, 623A, 622B, 623B that protrude toward the outside in the width direction of the vehicle and come in contact with the left and right inside surfaces 321A, 321B of the side plates 32A, 32B are formed at two locations in the up-down direction of the vehicles on the left and right flat plate sections 62A, 62B of the distance bracket 6. The convex sections 622A, 623A, 622B, 623B are formed along the entire length in the forward-backward direction of the flat surface sections 62A, 62B. The convex sections 622A, 622B on the side toward the top of the vehicle are formed at a position on the center axis of the outer column 1, and the convex sections 623A, 623B are formed at positions on the clamping sections 66A, 66B of the distance bracket 6. Convex sections that protrude toward the inside in the width direction of the vehicle can be formed at two location on the left and right inside surfaces 321A, 321B in the up-down direction of the vehicle, and the flat surface sections 62A, 62B of the distance bracket 6 can remain flat surfaces.

In this example, when fastening the steering wheel 103 to a desired position using the tilt and telescopic functions, as the operation lever 349 is rotated, the distance bracket 6 is clamped by the side plates 32A, 32B by way of the convex sections 622A, 623A, 622B, 623B. Therefore, the clamping force is transmitted to near the center axis position of the clamping sections 66A, 66B of the distance bracket and the outer column 1, thus improving the holding force when clamped. The construction and effects of the other parts of this twentieth example are the same as in the first example.

Example 21

Figure 38:
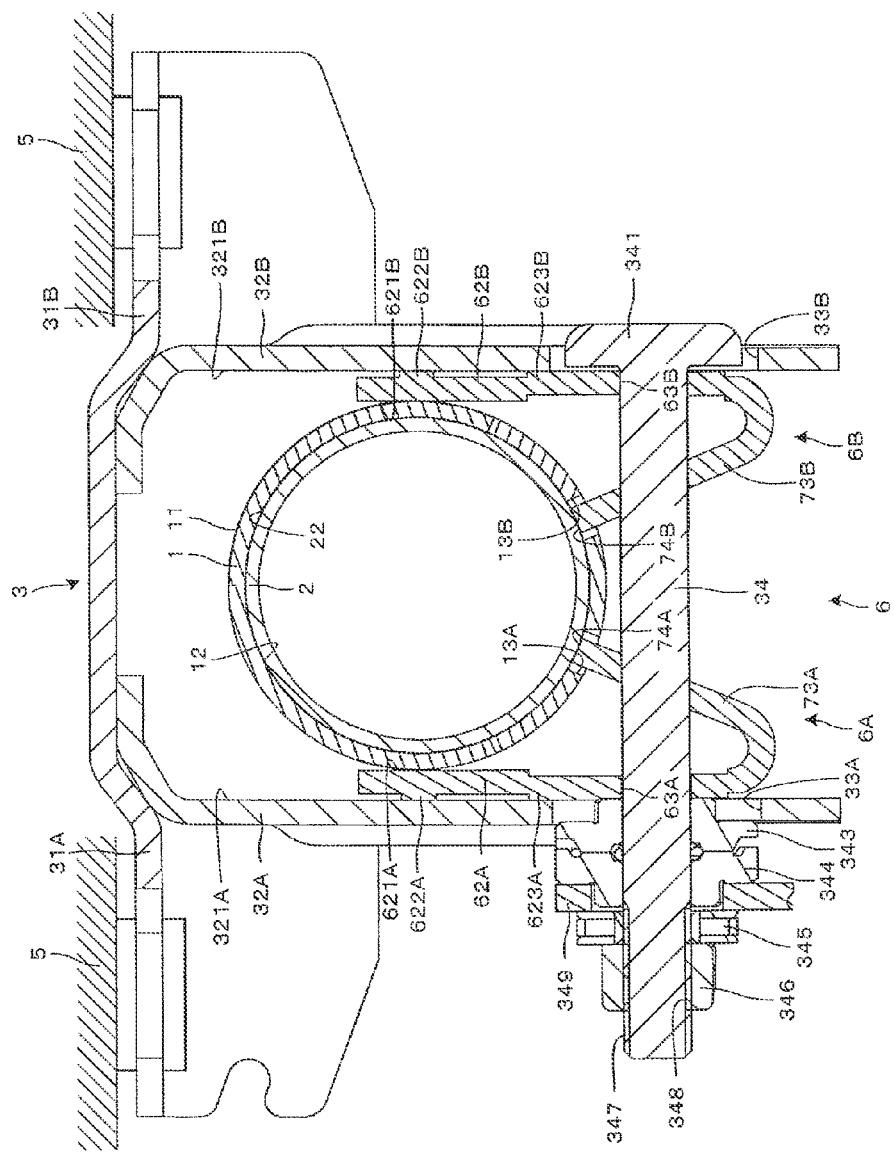
FIG. 38 is a cross-sectional view of a steering apparatus of a twenty-first example of an embodiment of the present invention, and is similar to FIG. 3
Figure 39:
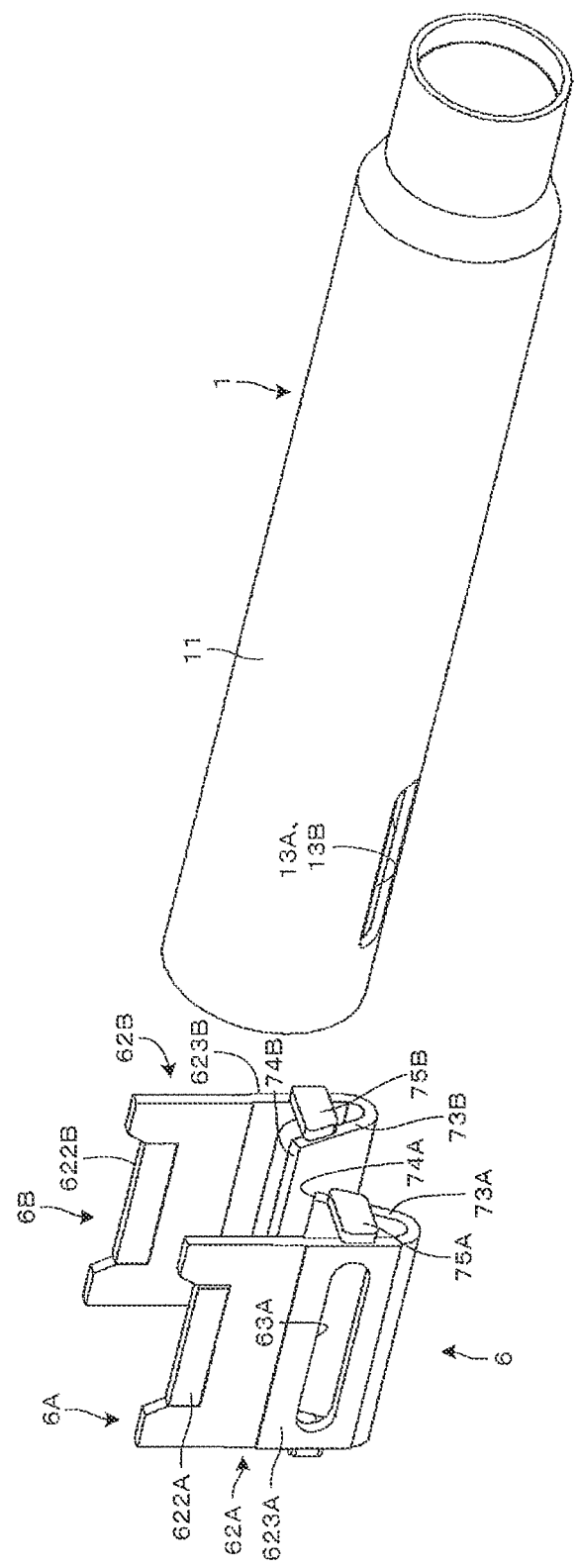
FIG. 39 is an exploded perspective view of the outer column and distance bracket of the steering apparatus in FIG. 38.

FIG. 38 and FIG. 39 illustrate a steering apparatus of a twenty-first example of an embodiment of the present invention. In the following explanation, the same reference numbers are used for parts and elements that are the same as in the first example, and any redundant explanations are omitted so that only the portions that differ from the first example are explained.

This example is an example wherein the clamping sections of the distance bracket 6 are formed so that the length in the axial direction that clamps the inner column 2 is long. The distance bracket 6 of this example is composed of a left distance bracket 6A and a right distance bracket 6B, and the inside surfaces 621A, 621B near the top end of the respective flat surface sections 62A, 62B are fastened to the outside surface of the outer circumferential surface 11 of the outer column 1 by welding. Convex sections 622A, 623A, 622B, 623B that protrude to the outside in the width direction of the vehicle are formed at two locations in the up-down direction of the vehicle in the flat surface sections 62A, 62B. The convex sections 623A, 623B on the side toward the bottom of the vehicle are formed along the entire length in the forward-backward direction of the vehicle of the flat surface sections. The convex sections 622A, 622B on the side toward the top of the vehicle are formed so that they are a little shorter than the entire length in forward-backward direction of the vehicle of the flat surface sections 62A, 62B. The convex sections 622A, 622B on the side toward the top of the vehicle are formed at positions on the center axis of the outer column 1, and the convex sections 623A, 623B on the side toward the bottom of the vehicle are formed at positions on the clamping sections 74A, 74B of the distance bracket 6 that will be explained next.

Bent sections 73A, 73B are formed in the left distance bracket 6A and right distance bracket 6*b* along the entire length in the forward-backward direction of the vehicle of the flat surface sections 62A, 62B on the bottom end of the flat surface sections 62A, 62B. The bent sections 73A, 73B are bent toward the inside in the width direction of the vehicle into a V shape. The bent sections 73A, 73B extend toward the center axis of the outer column 1 to the side toward the top of the vehicle, and a pair of straight left and right clamping sections is formed on the top ends. Moreover, reinforcement plates 75A, 75B are welded and fastened to both ends in the forward-backward direction of the vehicle of the bent sections 73A, 73B, and these reinforcement plates 75A, 75B connect both ends in the forward-backward direction of the vehicle of the flat surface sections 62A, 62B and the bend sections 73A, 73B and reinforce the bent sections 73A, 73B.

A pair of left and right through holes 13A, 13B through which the clamping sections 74A, 74B are inserted is formed in the outer column 1. The through holes 13A, 13B are formed so as to be long in the axial direction of the outer column 1, and are formed such that the dimensions are a little larger than the length in the axial direction of the clamping sections 74A, 74B. The clamping sections 74A, 74B are inserted through the through holes 13A, 13B, and these clamping sections 74A, 74B directly clamp the outer circumferential surface 22 of the inner column 2. In this example, the length of the clamping sections 74A, 74B is long in the axial direction that clamps the outer circumferential surface 22 of the inner column 2, so the rigidity when clamped is large, and thus it is possible to increase the clamping force. The construction and effects of the other parts of this twenty-first example are the same as in the first example.

Example 22

Figure 40:
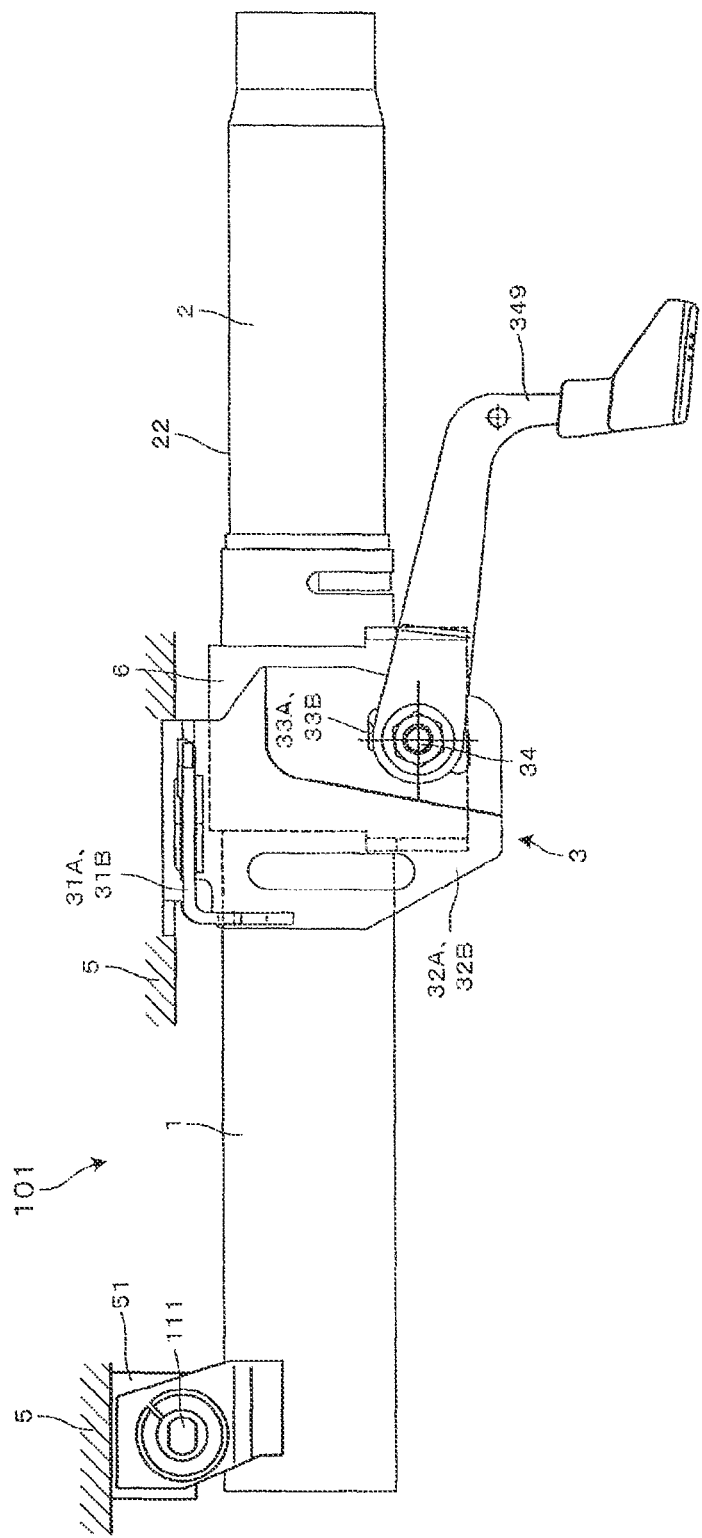
FIG. 40 is a front view illustrating the main parts of a steering apparatus of a twenty-second example of an embodiment of the present invention.

FIG. 40 illustrates a steering apparatus of a twenty-second example of an embodiment of the present invention. In the following explanation, the same reference numbers are used for parts and elements that are the same as in the first example, and any redundant explanations are omitted so that only the portions that differ from the first example are explained.

This example is an example wherein the end of the outer column 1 on the side toward the front of the vehicle is fastened to the vehicle, and the outer column 1 is located on the side toward the front of the vehicle, and the inner column 2 is located on the side toward the rear of the vehicle. In other words, as illustrated in FIG. 40, on the side of the outer column 1 toward the front of the vehicle (left side in FIG. 40), there is a lower vehicle installation bracket 51 that is attached to the vehicle 5, and a tilt shaft 111 that is fastened to the side of the outer column 1 that is toward the front of the vehicle is supported by the lower vehicle installation bracket 51 so as to be able to tilt. Moreover, the side of the outer column 1 that is toward the rear of the vehicle (right side in FIG. 40) is attached to the vehicle 5 by an upper vehicle installation bracket (vehicle installation bracket) 3.

A lower steering shaft (not illustrated in figure) is supported on the inside of the hollow cylindrical shaped outer column 1, and the left end of this lower steering shaft is connected to the intermediate shaft 105 by way of the universal joint illustrated in FIG. 1, and the lower end of the intermediate shaft 105 is connected to the steering gear 107.

The inner column 2 is fitted inside the side of the outer column toward the rear of the vehicle (right side in FIG. 40) so as to be able to slide in the axial direction. An upper steering shaft (not illustrated in the figure) is supported by the inner column 2 so as to be able to rotate, and this upper steering shaft fits with the lower steering shaft with a spline fit, such that the rotation of the upper steering shaft is transmitted to the lower steering shaft. The steering wheel 101 illustrated in FIG. 1 is attached to the side of the upper steering shaft toward the rear of the vehicle (right side in FIG. 40).

A pair of left and right flange sections 31A, 31B for attaching the upper vehicle installation bracket 3 to the vehicle 5 are formed on the upper part of the upper vehicle installation bracket 3. A distance bracket 6 is held between the inside surfaces of left and right side plates 32A, 32B that are integrally formed with the flange sections 31A, 31B and extend in the up-down direction so that this distance bracket 6 can move in the up-down direction.

An arc shaped section on the upper portion of the distance bracket 6 that is integrally formed into a U shape fits around the outside of the outer circumferential surface 11 of the outer column 1 and is fastened to the outer circumferential surface 11 by welding. As in the first example, a pair of arc shaped left and right clamping sections 66A, 66B are formed on the inside surface in the width direction of the vehicle of bent sections 64A, 64B of the distance bracket 6. A pair of left and right through holes 13A, 13B through which the clamping sections 66A, 66B are inserted are formed in the outer column 1.

Circular holes (not illustrated in the figure) are formed in the distance bracket 6 in a direction orthogonal to the paper surface in FIG. 40, and a circular rod shaped clamping rod 34 is inserted through long grooves 33A, 33B in the up-down direction that are formed in the side plates 32A, 32B and the circular holes from a direction orthogonal to the paper surface in FIG. 40. The long grooves 33A, 33B in the up-down direction are formed into an arc shape that is centered around the tilt shaft 111.

The distance bracket 6 is held between the inside surfaces of the left and right side plates 32A, 32B so as to be able to move in the up-down direction. When fastening the steering wheel 103 to a desired position using the tilt and telescopic functions, by rotating the operation lever 349, the side plates 32A, 32B are clamped, and the distance bracket 6 is clamped. The pair of left and right clamping sections of the distance bracket 6 clamps the outer circumferential surface 22 of the inner column 2.

On the other hand, when releasing the fastened steering wheel 103, the operation lever 349 is rotated in the opposite direction, which separates the side plates 32A, 32B and releases the clamped distance bracket 6. As a result, the distance bracket 6 and inner column 2 can be moved to a desired position in the up-down direction and forward-backward direction. The steering wheel 103 is gripped and the inner column 2 is moved in the axial direction with respect to the outer column 1 to adjust the steering wheel to a desired position in the forward-backward direction. In this example, the distance bracket 6 is maintained in the fastened position with the outer column 1. Moreover, the steering wheel 103 is gripped and moved in the up-down direction around the tilt shaft 111 to adjust the steering wheel 103 to a desired tilt direction. After that, by clamping the distance bracket 6 with the upper vehicle side bracket 3, the pair of left and right clamping sections of the distance bracket 6 clamps the outer circumferential surface 22 of the inner column 2.

In this example, there is no need to provide long grooves 63A, 63B in the forward-backward direction in the distance bracket 6 as in the first example, so construction of the distance bracket 6 is simple, and thus manufacturing cost can be reduced. The construction and effect of other parts of this twenty-second example are the same as in the first example.

An embodiment of the present invention was explained based on examples of applying the present invention to a tilt and telescopic type of steering apparatus that is capable of adjustment both the up-down position and the forward-backward position of the steering wheel, however the present invention can also be applied to a steering apparatus that comprises only a telescopic function. Moreover, in an embodiment of the present invention, normally the inner column fits in the side of the outer column toward the front of the vehicle so as to be able to slide in the axial direction, however, as in the twenty-second example, it is possible to apply the construction of the other examples of an embodiment of the present invention to a steering apparatus wherein the outer column fits around the side of the inner column toward the front of the vehicle so as to be able to slide in the axial direction. Furthermore, in an embodiment of the present invention, the clamping rod is placed on the side of the outer column toward the bottom of the vehicle, however, as in the fifteenth example, it is possible to apply the construction of the other examples of an embodiment of the present invention to a steering apparatus wherein the clamping rod is located on the side of the outer column toward the top of the vehicle. In this way, each of the examples of an embodiment of the present invention, as long as combinations pose no problem, can be applied to the construction of other examples. Furthermore, the present invention is not limit to these examples of an embodiment.

EXPLANATION OF REFERENCE NUMBERS

101 Steering apparatus
102 Steering shaft
103 Steering wheel
104 Universal joint
105 Intermediate shaft
106 Universal joint
107 Steering gear
108 Tie rod
1 Outer column
11 Outer circumferential surface
111 Tilt shaft
12 Inner circumferential surface
13A, 13B Through hole
14A, 14B Through hole
15A, 15B Through hole
151A, 151B Through hole
16A, 16B Through hole
17 End surface on the side toward the front of the vehicle
18 Load receiving section
19 Center axis line
2 Inner column
21 Tilt shaft
22 Outer circumferential surface
221A, 221B, 221C, 221D Convex section
222A, 222B, 222C, 222D Concave section
23 Bushing
24A, 24B Through hole
3 Upper vehicle installation bracket (vehicle installation bracket)
31A, 31B Bushing
32A, 32B Side plate
321A, 321B Inside surface
33A, 33B Long groove in the up-down direction
34 Clamping rod
341 Head section
342 Rotation stopper
343 Stationary cam
344 Movable cam
345 Thrust bearing
346 Adjustment nut
347 Male thread
348 Female thread
349 Operation lever
41 Upper steering shaft
42 Lower steering shaft
5 Vehicle
51 Lower vehicle installation bracket
6 Distance bracket
6A Left distance bracket
6B Right distance bracket
61 Arc shaped section
611 Trapezoidal section
61A, 61B Arc shaped section
61C, 61D Inclined edge
61E Orthogonal edge
62A, 62B Flat surface section
621A, 621B Inside surface
622A, 622B Convex section
623A, 623B Convex section
63A, 63B Long groove in the forward-backward direction
64A, 64B Bent section
641A, 641B Protruding section
65A, 65B Lower side bent section
66A, 66B Clamping section
661A, 661B Clamping section
662A, 662B Clamping section
67A, 67B Bent section
68A, 68B Clamping section
69A, 69B Long groove in the forward-backward direction
71A, 71B Resin member
72A, 72B Clamping section
73A, 73B Bent section
74A, 74B Clamping section
75A, 75B Reinforcement plate

What is claimed is:

1. A steering apparatus, comprising:
   an inner column;
   an outer column that is fitted around the inner column such that relative sliding movement is possible, and that comprises a pair of left and right through holes;
   a vehicle installation bracket comprising a left side plate and a right side plate, and vehicle installation bracket attachable to a vehicle;

a distance bracket that comprises a pair of left and right clamping sections that are inserted through the pair of left and right through hole and can clamp an outer circumferential surface of the inner column, and together with being fastened to an outer circumferential surface of the outer column, is held between the left side plate and the right side plate of the vehicle installation bracket to be able to slide; and a clamping apparatus that clamps the left side plate and the right side plate of the vehicle installation bracket onto the distance bracket;

wherein the pair of left and right clamping sections are formed at both ends of the distance bracket in a front and rear direction of the vehicle, the pair of left and right clamping sections on a rear side of the vehicle being inserted in the through holes, and the pair of left and right clamping sections on the front side of the vehicle being disposed forward from an end surface of the outer column on a front side of the vehicle, wherein, when the distance bracket is clamped by the left side plate and the right side plate of the vehicle installation bracket by the clamping apparatus, the pair of left and right clamping sections of the distance bracket directly clamp the outer circumferential surface of the inner column, such that relative movement in an axial direction of the inner column with respect to the outer column is not possible;

wherein a portion of the distance bracket that is fitted around the outer column has an inclined edge that is inclined with respect to a center axis line of the outer column and is fastened to the outer circumferential surface of the outer column by welding the inclined edge to the outer circumferential surface of the outer column such that a major axis of the weld that fastens the distance bracket to the outer column is inclined with respect to the center axis line of the outer column.

2. The steering apparatus according to claim 1, wherein the distance bracket is integrally formed into a U shape, and an arc shaped section of the distance bracket fits around the outer circumferential surface of the outer column.

3. The steering apparatus according to claim 1, wherein the distance bracket is divided into left and right components, and one end of each of the components is fastened to the outer circumferential surface of the outer column.

4. The steering apparatus according to claim 1, wherein bent sections that are bent toward an inside in a width direction of the vehicle are formed on both ends in a forward-backward direction of the vehicle of a portion of the distance bracket that is held between the left side plate and the right side plate of the vehicle installation bracket, and the clamping sections are formed on the inside surfaces in the width direction of the vehicle of the bent sections.

5. The steering apparatus according to claim 1, wherein bent sections or protruding sections that extend toward an inside in a width direction of the vehicle are formed along the entire length in a forward-backward direction of a portion of the distance bracket that is held between the left side plate and the right side plate of the vehicle installation bracket, and the clamping sections are formed by the surfaces of the bent sections or protruding sections that come in contact with the outer circumferential surface of the inner column.

6. The steering apparatus according to claim 1, wherein the left and right clamping sections of the distance bracket are arc shaped or straight.

7. The steering apparatus according to claim 1, wherein the left and right clamping sections of the distance bracket constructed to clamp the outer circumferential surface on a side of the inner column toward a bottom of the vehicle, or the outer circumferential surface of the inner column toward a top of the vehicle.

8. The steering apparatus according to claim 1, wherein the inner column and the outer column are formed into a hollow cylindrical shape or a hollow polygonal pipe shape.

9. The steering apparatus according to claim 1, wherein a side toward a front of the vehicle of the inner column or outer column is constructed to be able to be fastened to the vehicle.

* * * * *